(12) United States Patent
Bryant

(10) Patent No.: US 8,019,547 B2
(45) Date of Patent: *Sep. 13, 2011

(54) REMOTELY RECONFIGURABLE SYSTEM FOR MAPPING SUBSURFACE GEOLOGICAL ANOMALIES

(75) Inventor: John Bryant, Carrollton, TX (US)

(73) Assignee: Bryant Consultants, Inc., Carrollton, TX (US)

( * ) Notice: Subject to any disclaimer, the term of this patent is extended or adjusted under 35 U.S.C. 154(b) by 571 days.

This patent is subject to a terminal disclaimer.

(21) Appl. No.: 12/072,579

(22) Filed: Feb. 27, 2008

(65) Prior Publication Data

US 2008/0221797 A1 Sep. 11, 2008

Related U.S. Application Data

(63) Continuation-in-part of application No. 11/472,901, filed on Jun. 22, 2006, now Pat. No. 7,386,402.

(51) Int. Cl.
*G01V 3/02* (2006.01)
*G01L 1/20* (2006.01)
*G01R 19/00* (2006.01)
*G01R 19/14* (2006.01)

(52) U.S. Cl. .................. 702/7; 702/53; 702/57; 702/64

(58) Field of Classification Search .................. 702/6, 7, 702/11, 57, 64, 109, 182, 183, 188; 73/584; 166/250.01; 324/345, 355; 326/38
See application file for complete search history.

(56) References Cited

U.S. PATENT DOCUMENTS

| | | | | |
|---|---|---|---|---|
| 3,967,201 A | | 6/1976 | Rorden | |
| 4,015,234 A | | 3/1977 | Krebs | |
| 6,003,376 A | * | 12/1999 | Burns et al. | 73/584 |
| 6,025,735 A | * | 2/2000 | Gardner et al. | 326/38 |
| 6,057,800 A | | 5/2000 | Yang et al. | |
| 6,226,601 B1 | | 5/2001 | Longaker | |
| 6,295,512 B1 | * | 9/2001 | Bryant | 702/189 |
| 6,332,109 B1 | | 12/2001 | Sheard et al. | |
| 6,975,942 B2 | * | 12/2005 | Young et al. | 702/5 |
| 6,977,505 B1 | * | 12/2005 | Rosenquist | 324/345 |
| 6,978,833 B2 | | 12/2005 | Salamitou et al. | |
| 7,003,400 B2 | | 2/2006 | Bryant | |
| 7,114,560 B2 | | 10/2006 | Vinegar et al. | |
| 7,114,561 B2 | * | 10/2006 | Vinegar et al. | 166/250.01 |
| 7,202,671 B2 | * | 4/2007 | Strack et al. | 324/355 |
| 2003/0040882 A1 | | 2/2003 | Sheard et al. | |
| 2003/0205376 A1 | | 11/2003 | Ayoub et al. | |
| 2005/0165555 A1 | | 7/2005 | Jackson | |
| 2006/0028208 A1 | * | 2/2006 | Strack et al. | 324/355 |

* cited by examiner

*Primary Examiner* — Mohamed Charioui
*Assistant Examiner* — Felix E Suarez
(74) *Attorney, Agent, or Firm* — Schultz & Associates, P.C.

(57) ABSTRACT

Methods and apparatus are provided for receiving, detecting and transmitting geophysical data from a plurality of electrodes placed in the soil utilizing a dynamically reconfigurable wireless control unit that is located on each electrode. Data from the control units is transmitted by a wireless signal to a centralized data processor for analysis. Control data is provided from a central control processor to the control unit by wireless transmission. The control unit, which is positioned, includes a multi-channel radio frequency transmitter/receiver and a processor to actuate relays and record data returns from the measured substrate soil for transmission to the central data processor. The control unit incorporates a changeable code or address to unambiguously identify itself, and its spatial relationship to other electrodes, to the central data processor and the central control processor. The control units are equipped with a GPS positioning device to allow for automatic transmission of electrode location and for electrode placement without a manual survey being required.

30 Claims, 17 Drawing Sheets

| VCU | Mux 1 | Mux 2 | Mux 3 | $R_1$ | $R_2$ |
|---|---|---|---|---|---|
| 1 | 1 | 1 | 2 | 1 | 2 |
| 2 | 1 | 1 | 2 | 2 | 1 |
| 3 | 2 | 3 | 2 | X | X |
| 4 | 1 | 1 | 3 | X | X |
| 5 | X | X | X | X | X |
| 6 | X | X | X | X | X |
| 7 | X | X | X | X | X |
| 8 | X | X | X | X | X |

Mask 1

| VCU | Mux 1 | Mux 2 | Mux 3 | $R_1$ | $R_2$ |
|---|---|---|---|---|---|
| 1 | 1 | 1 | 2 | 1 | 2 |
| 2 | 1 | 1 | 2 | 2 | 1 |
| 3 | 2 | 3 | 2 | X | X |
| 4 | X | X | X | X | X |
| 5 | 1 | 1 | 3 | X | X |
| 6 | X | X | X | X | X |
| 7 | X | X | X | X | X |
| 8 | X | X | X | X | X |

Mask 2

FIG. 15

REMOTELY RECONFIGURABLE SYSTEM FOR MAPPING SUBSURFACE GEOLOGICAL ANOMALIES

CROSS-REFERENCE TO RELATED APPLICATIONS

This application is a Continuation-In-Part claiming priority benefit from U.S. patent application Ser. No. 11/472,901 which was filed on Jun. 22, 2006, now U.S. Pat. No. 7,386,402 issued on Jun. 10, 2008.

TECHNICAL FIELD OF THE INVENTION

This invention relates to a method for producing a subsurface electrical resistivity model. More specifically, this invention relates to a method for resistivity modeling for locating anomalies, such as groundwater, leaks, tree roots, and other vegetation, particularly beneath and around existing structures. Raw resistivity data is collected by a reconfigurable wireless network of sensors that distributes current and measures voltage. A regression correlation is performed on the raw resistivity data to create a resistivity model, which is converted to graphical form, then analyzed to detect and locate subsurface soil anomalies. A three dimensional "movie" is then prepared to analyze the anomalies in near real time.

BACKGROUND OF THE INVENTION

Detecting and locating fluid leaks beneath slab-on-grade foundations is often a difficult and destructive task. Because the slab blocks access to the soil underneath, one must either break up the slab to inspect the subjacent soil or drill relatively large holes through the slab to bore soil samples. Further, these methods require a certain amount of guesswork because of the uncertain location of suspected leaks. Consequently, a number of holes must be drilled or even jack hammered through the slab before the actual leak is located.

A less destructive method of detecting and locating leaks beneath slab foundations involves directing a radar signal down through the slab and into the subjacent soil. Because the radar return from wet soil will differ from that of dry soil, using radar may allow one to approximate a leak location without partially destroying the slab. However, certain types of reinforced slab foundations may attenuate the radar signal sufficiently such that an accurate return from the subjacent soil is unobtainable. Moreover, radar is not well suited to detecting small leaks, nor for differentiating between small leaks and variations in soil composition or the presence of roots and other plant matter.

Methods currently exist for detecting and locating leaks from landfills, hazardous waste dumps, impoundments, and other outdoor fluid containment areas by measuring changes in the conductivity and/or resistivity of the adjacent soil. Daily et al. '406 discloses mise-a-la-masse and electrical resistance tomography leak location methods. Mise-a-la-masse involves driving an electrode within a fluid containment facility to an electrical potential with respect to another electrode placed at a distance from the facility. Voltage differences are then measured between various combinations of additional electrodes placed in the soil adjacent to the facility. The leak location is located by determining the coordinates of a current source pole that best fits the measured potentials within the constraints of the known or assumed resistivity distribution. Because the potentially leaking fluid must be driven to a potential, mise-a-la-masse methods can monitor for leaks in continuous fluid systems only, such as ponds, lined fluid containment areas, and tanks.

Electrical resistivity tomography (ERT) involves placing electrodes around the periphery of, beneath, or, in the case of subsurface containment vessels, above the facility. A known current is applied to alternating pairs of electrodes, then the electrical potential is measured across other alternating pairs of electrodes. From this data the electrical resistivity at a plurality of points in the soil can be calculated. Disturbances in resistivity will correlate with migration of leaking fluid. However, Daily does not disclose a method or apparatus that allows the electrodes to be placed directly under the leak source, after construction of a building or other structure.

Henderson '202 and '045 both disclose directly monitoring the soil subjacent to a fluid containment area by burying electrodes directly beneath the containment. Both Henderson patents disclose a plurality of four-plate electrode systems. A voltage and a known current are applied across the outer pair of plates. The resulting potential difference is measured across the inner pair. Henderson '045 also discloses a system of individual electrodes that, by varying the spacing between the electrodes impressing a current into the ground and the spacing of the potential measurement electrodes, can indirectly measure the resistivity at a calculated depth. However, Henderson '045 does not disclose a method of directly monitoring the subgrade beneath a structure without permanently burying the electrodes or a method to place electrodes beneath an existing structure.

Woods et. al '244 discloses a leak detection system for radioactive waste storage tanks. The system comprises a metal tank, an AC generator connected between the tank and a reference electrode, and a plurality of reference electrodes. When the generator is energized, it creates an electric field in the ground between the tank and the reference electrode. A voltmeter measures the potential difference between the sensing electrodes and the tank. A significant change in the potential at one or more of the sensing electrodes indicates that the tank has developed a leak. Woods et al. has a number of disadvantages. First, it requires an electrically conductive fluid container. Second, it requires that the electrodes be permanently buried in the soil surrounding the tank. Finally, it requires the use of an AC generator, which is less convenient than a DC power source.

Bryant '625 discloses a method and apparatus for creating an electrical resistivity map of the volume beneath a slab foundation or other structure by placing electrodes through a foundation, and applying a current through them. Bryant '625 further discloses a method for converting the measured potential to a resistivity value, assigning the resistivity value to a spatial coordinate, and storing a plurality of values in computer files. The apparatus includes an array of electrodes that are used to impress a known current in the soil and measure the resulting electrical potential of electrodes. Typically, a pair of electrodes are used to impress a constant current, and another pair are used to measure a voltage potential.

The array of electrodes are interconnected by electrical conducting cables that connect to the various electrodes at predetermined intervals. The interconnecting cables transmit electrical current that passes though certain electrodes to create the electrical field within the underlying and subjacent soil, and return electrical signals from other measuring electrodes that detect the electrical field within the soil. However, Bryant does not disclose the ability to switch current between nodes or to conduct an orderly permutation of voltage measurements between nodes.

None of the prior art is entirely satisfactory to locate fluid leaks beneath an existing slab foundation and analyze them in near real time. For instance, it is not practical to electrify the potentially leaking fluid—typically a plumbing system—and because there may exist multiple sources of fluid, mise-a-lamasse is not a practical option. Nor is it practical to embed permanently a series of electrodes beneath the slab to monitor soil resistivity. Further, because some of the ERT methods—for example, the Henderson references—use multiple-plate electrodes, a large hole would have to be bored into the slab to insert the electrodes into the subjacent soil making the method impractical and destructive. In addition, placing the electrodes around the periphery of the foundation is less accurate compared to placing the electrodes directly beneath the potential leak source.

Some methods of employing wireless sensors are available in the art. For example, those shown in U.S. Pat. No. 6,332,109 B1 to Sheard. Sheard discloses a data acquisition system for obtaining data from a geological surface at a plurality of equally spaced apart locations using nodes. FIG. 1 of that patent shows nodes which can wirelessly transmit information such as a characteristic voltage to a receiver. However, Sheard does not provide a method of distributing current to various nodes for systematically reading all the permutations of voltages provided pursuant to the distributed current to provide a complete and reliable data set. Also, Sheard does not provide a method to address each node dynamically so that the nodes are truably interchangeable.

Another example is U.S. Pat. No. 6,226,601 B1 to Longaker. Longaker provides a wireless seismic survey system that is structured as a hierarchy of cell network layers, the higher network layers covering a larger area and the lower network layers covering smaller areas. However, Longaker does not provide for multiple positions of injection current or the controlled monitoring of a permutation of voltages between nodes. Also, Longaker does not provide for dynamically addressable sensors to allow for easy interchangeability.

The current state of the art is unsatisfactory because it does not provide a method to remotely change injection current locations or to conduct an orderly progression through a permutation of voltages and currents between nodes. Moreover, the state of the art does not provide for dynamically addressable sensors whose location and address can be changed on the fly.

Furthermore, the present state of the art requires that the electrodes be placed in a linear, regularly spaced grid pattern that does not provide needed flexibility in the physical layout of arrays of electrodes in multiple, non-linear arrangements. The present state of the art presumes that the locations of the electrodes to one another. It may be necessary to arrange the electrodes in a non-linear grid if the physical layout of the foundation or underlying area to be measured prevents the layout of electrodes in a typical, linear grid arrangement. It may be necessary to locate certain electrodes in a non-linear pattern to accommodate obstructions or to conform the layout of the grid to a particular slab configuration or other geographic anomaly. Where a need arises to arrange the electrodes in a non-linear grid, it may be necessary to identify the spatial relationship of the electrodes. Likewise, it may be necessary to adjust the location of certain electrodes to accommodate obstructions and thus, it may be necessary to identify the new location.

Furthermore, the present state of the art requires that electrodes be placed according to a measured or surveyed pattern at the physical location. The requirement of physically measuring and placing electrodes is hampered by structures which include walls or other obstructions which makes placing the electrodes accurately difficult. The inaccurate placement of electrodes leads to errors in the mathematical calculations required to analyze the locations of the anomalies and therefore reduces the overall efficiency and accuracy of the system.

The present state of the art is further unsatisfactory because the sensors are affixed to the interconnecting cables and to the electrodes at predetermined intervals. A sensor or a part of the interconnecting cable or an electrode may become damaged or cease to function and require replacement. Physical damage to or failure of a given sensor within a long strand of conducting cable requires replacement of the sensor or substitution of a conducting cable, frequently associated with a substantial downtime for repair or replacement. In order to repair a part of the interconnecting cable, sensor and electrode combination, if may be necessary to remove the entire section of cable with a plurality of sensors and electrodes, from service and effect expensive and time-consuming repairs.

Moreover, the state of the art does not provide for interchangeability of sensors. The uniqueness of sensors required by the prior art creates a need for specific sensors uniquely identified by their order in a specific grid. This limitation requires extensive time in setting up a grid and replacing defective sensors.

Furthermore, the sensors are typically arranged on long sections of interconnecting conductive cabling used to transmit control signals, measurement signals and impressing current. The voltage loses in such cabling are substantial and require corrective and potentially inaccurate algorithms in the analytical software used to generate the subterranean mapping.

Accordingly, a need exists for a method for locating fluid leaks and other anomalies beneath slab-on-grade foundations without the need for destroying the slab or permanently burying electrodes beneath the slab. Additionally, a need exists for a method and apparatus to map a three-dimensional subjacent volume's electrical resistivity with both static and dynamic electrodes. A further need exists for a method to accurately place electrodes in a grid.

A need further exists in the art for a method of wirelessly reconfiguring the position of current sources and voltage meters among electrodes. A need further exists for a non-unique sensor attached to the electrodes which is addressable and reconfigurable so that expensive and time consuming cable and sensor unit replacement is unnecessary. A need further exists for real time three-dimensional movies of anomaly movements which are subsurface. Further, a need exists for accurate measurement of voltage offsets to accurately calibrate voltage readings among sensors.

SUMMARY OF THE INVENTION

Soil, rocks, and vegetative matter can conduct electricity to varying degrees. The resistance, or resistivity, of these materials to an electrical current will vary depending upon density, particle composition, moisture content, and the chemical composition of fluid in the spaces between the particles. A fluid leak from, for example, pipes in a slab foundation into the subjacent soil will affect the electrical resistivity (electrical resistance offered by a material to the flow of current, times the cross-sectional area of current flow and per length of current path). Liquid leaking from the pipes, through the slab, and into the subjacent soil will soak the soil. Water decreases the resistivity of the subgrade. Measuring soil resistivity at varying depths and at varying locations, both beneath and adjacent to a slab foundation, and comparing these resistivities to one another, allows one the location of soil anomalies based on resistivity variations. These anomalies can include, of course, wet soil, as from a leak. Other anomalies include tree root growth, other vegetative matter, as well as voids or spaces in the soil beneath the foundation. The location of resistivity anomalies will correspond to the location of subgrade soil anomalies.

Resistivity cannot be measured directly; however, resistivity can be computed if the intensity of a current injected into the ground, and the resulting potential difference established between measurement electrodes are measured. These quantities depend on the geometry of the electric field, the nature of the soil and interstitial fluid, and the method used to measure the injected current and the resulting potential difference.

The present invention contemplates converting the measured potential to a resistivity value, assigning the resistivity value to a spatial coordinate, and storing these values in a computer file. A computer program then performs a least squares data inversion analysis on the resistivity and location values, creating a electrical resistivity model that minimizes the error of the field data. Next, another computer program performs a spatial data analysis, or geostatistical analysis, using kriging or other methods.

The present invention provides for a method and apparatus for wirelessly transmitting control data from a control processor to a sensor to wirelessly reconfigure the sensor. The invention also provides for wirelessly transmitting data from a plurality of sensors to a data processor for creating 2-D and 3-D graphical representations of areas of equipotential resistivity. The invention also provides for an automatic method of replacing sensors to account for damaged counterparts.

In one aspect of the invention, the sensor associated with each electrode includes is a wireless transmitter and receiver. The wireless transmitter and receiver eliminate the need for individual leads that connect each data connection device to the control processor. The wireless transmitter and receiver further eliminate the need for pre-fabricated cable assemblies that are permanently connected between the sensors and to the electrodes. In one aspect of the invention, the sensors are connected to the electrodes and are further inter-connected to one another with a current source by a common extension cord through standard type connections.

In one aspect of the invention, the sensor includes a mechanical way (such as thumbwheels) to generate a unique electronic address for each sensor to allow communication with the control processor and to identify the location of the sensor in an array of electrodes. The unique address of each sensor can also be established by the infrared transmission of address information to the sensor. The address of each wireless transmitter and receiver can also be electronically established by control software running on the control processor.

In another aspect of the invention, the control processor can identify and transmit instructions to manage current distribution, data and voltage measurements data at each sensor.

In an alternative aspect of the invention, each sensor includes a Global Positioning System (GPS) receiver that provides the control processor with a spatial location for the sensor and a correlation between that sensor and its spatial location. The invention further provides the advantage of automatic location of the sensors by GPS signals. Further, the GPS location of the sensors provides increased accuracy in location of the sensors which allows for more accurate calculation of the resistivity model.

In the event of damage to a sensor or damage to an interconnecting cable, a replacement sensor or cable may be added to the array of sensors without excessive downtime and expensive field repairs because all of the sensors are identical and the cables are standard 3-conductor extension cords. The replacement sensor can unambiguously identify itself and its spatial relationship with respect to other sensors to the control processor for use by the mapping software.

The use of wireless communications further eliminates the use of complex control cabling and the substantial voltage losses and inaccuracies associated with them.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 15 is a diagram of examples of two control masks transmitted from the master controller to a voltage control unit of the present invention.

DETAILED DESCRIPTION

Figure 1:
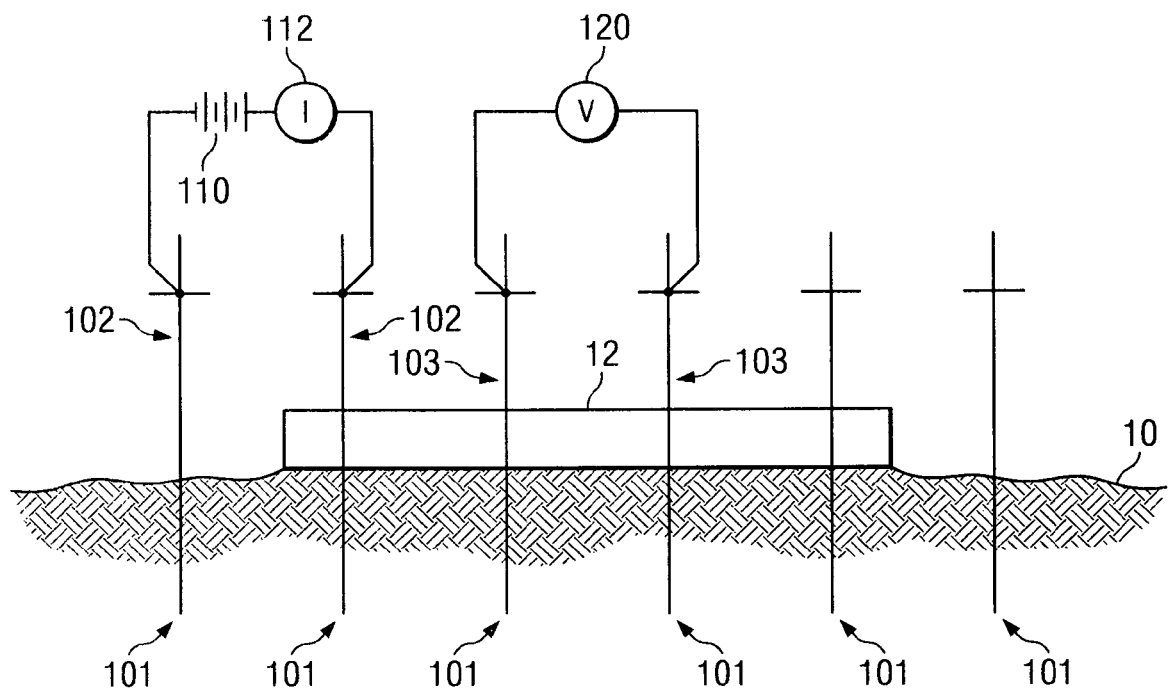
FIG. 1 is a schematic diagram of the injection of current into the ground and monitoring of a resulting voltage.
Figure 2:
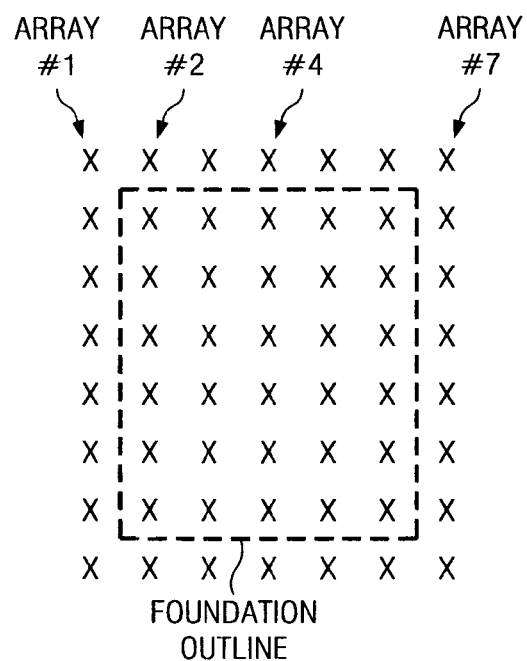
FIG. 2 is a schematic diagram of an electrode array.

A schematic diagram of the theory used to gather data as used in the invention is shown in FIG. 1. A series of electrodes 101 are inserted, typically in a line, into the ground 10. In some situations, the electrodes are inserted through a concrete slab foundation 12 in order to determine resistivity under a building or existing structure. The locations of the electrodes 101 are typically in a regular pattern with a known interstitial distance. An example of an array of electrodes is shown in FIG. 2.

In practice, the first pair of electrodes 101 is connected to a DC or low frequency AC current source 110. This pair of electrodes is referred to as current electrodes 102. Current source 110 impresses a current into the ground through current electrodes 102. In series with current electrodes 102 and current source 110 is an ammeter 112. Ammeter 112 measures the current injected into the ground by current source 110. A second pair of electrodes, potential electrodes 103, are connected to a volt meter 120 in series between them. Volt meter 120 measures the potential difference across voltage electrodes 103 created by the current impressed into the ground by current source 110 through electrodes 102.

In order to create a complete resistivity map, the voltage must be obtained at every possible permutation of electrodes in the array. Moreover, in order to obtain a complete resistivity map, the current source must be also moved to every possible permutation of electrodes.

For example, FIG. 3 shows, schematically, one method envisioned by the invention for obtaining a resistivity map by various permutations of the position of current source 110 and voltage meter 120. In FIG. 3a, ammeter 112 and current source 110 are connected to the first and second electrodes 101. Volt meter 120 is connected to the third and fourth electrodes in position 121a. Readings are then taken as will be fully described later. The volt meter is then connected at position 121b between the third and fifth electrodes 101. While the volt meter remains connected to the third electrode, it is also connected to the sixth, seventh and eighth electrodes in order (121c, 121d and 121e, respectively) and readings are taken at each connection.

Figure 3A:
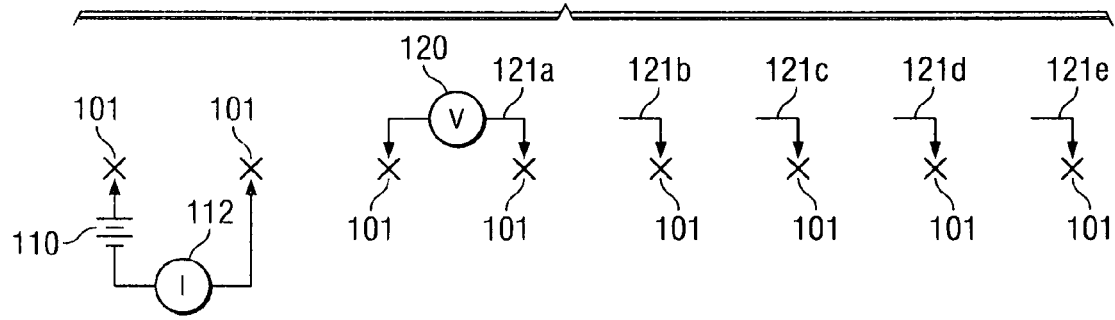
FIG. 3 a-g are schematic diagrams of a series of permutations of the locations of an ammeter and a current source and a volt meter as employed by one embodiment of the current invention.
Figure 3B:
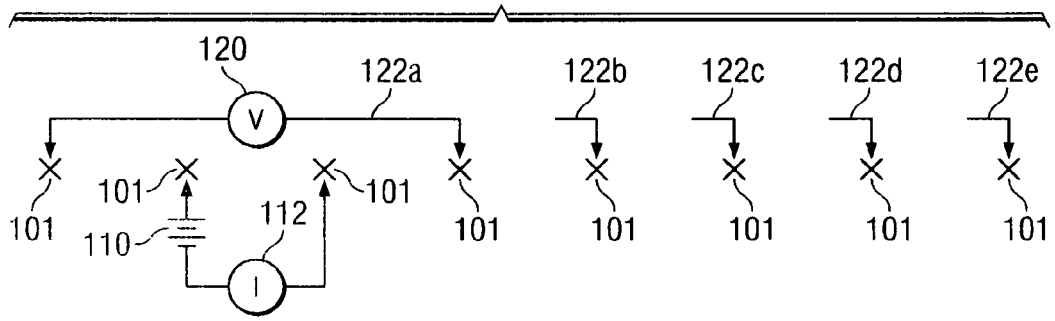

Ammeter 112 and current source 110 are then moved to the second and third electrodes as shown in FIG. 3b. Volt meter 120 is then connected between the first and fourth electrode position at position 122a and readings are taken. The volt meter is then connected to the fifth, sixth, seventh and eighth electrodes in the array shown at positions 122b, 122c, 122d and 122e, respectively. Readings are taken at each separate connection.

Figure 3C:
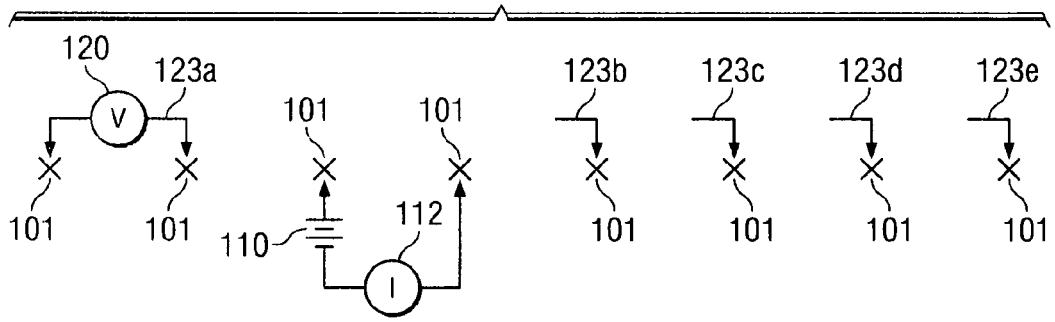
Figure 3D:
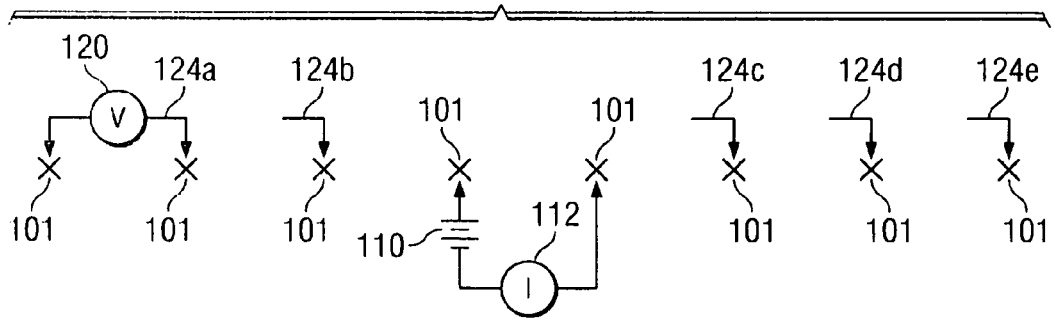

FIG. 3c shows the ammeter and current source being moved to the third position between the third and fourth electrodes. The volt meter is then connected between the first and second electrodes as shown in position 123a. It is then connected to the fifth, sixth, seventh and eight electrodes in the array shown at positions 123b, 123c, 123d and 123e, respectively. Readings are taken at each connection of the volt meter. FIG. 3d shows the ammeter moved to a fourth position between the fourth and fifth electrodes. The volt meter again is connected between the first and second electrodes shown at position 124a. It is then connected to other electrodes in the array at positions 124b, 124c, 124d and 124e, and readings are taken at each connection.

Figure 3E:
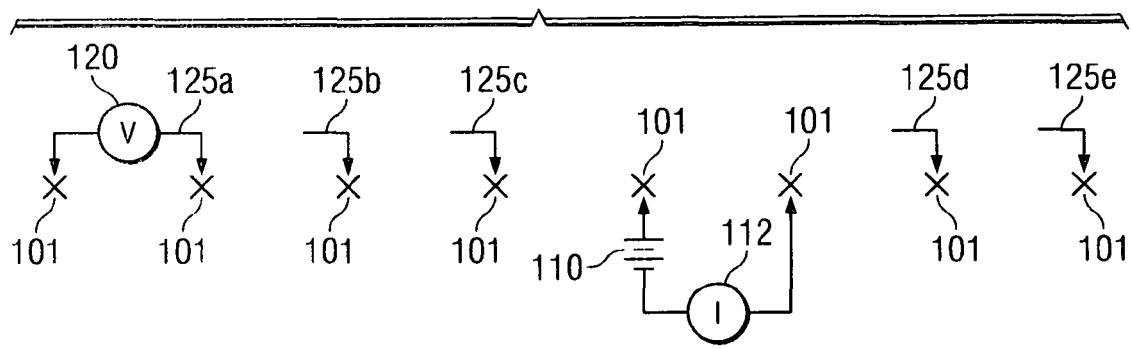

As shown in FIG. 3e, the ammeter and current source is moved in to a fifth position between the fifth and sixth electrodes. The volt meter connected as shown at 125a and then subsequently as shown at positions 125b, 125c, 125d and 125e. Readings are taken at each connection.

Figure 3F:
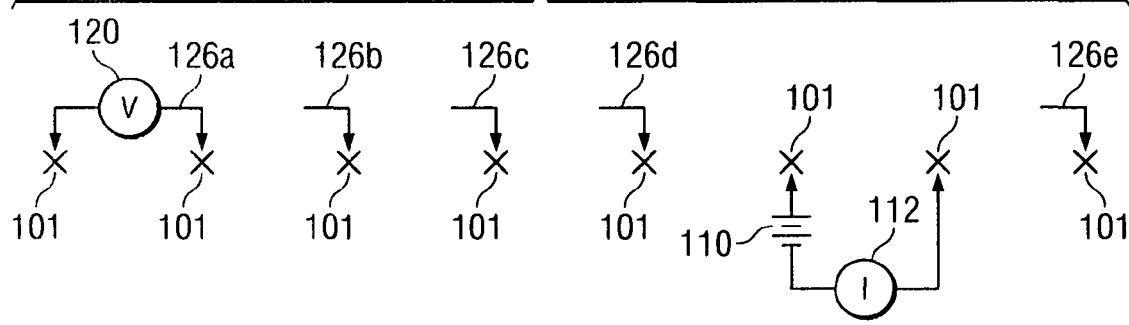

FIG. 3f shows the ammeter and current source shown in a sixth position between the sixth and seventh electrodes. The volt meter is shown connected in positions 126a, 126b, 126c, 126d, and 126e. Readings are taken at each connection.

Figure 3G:
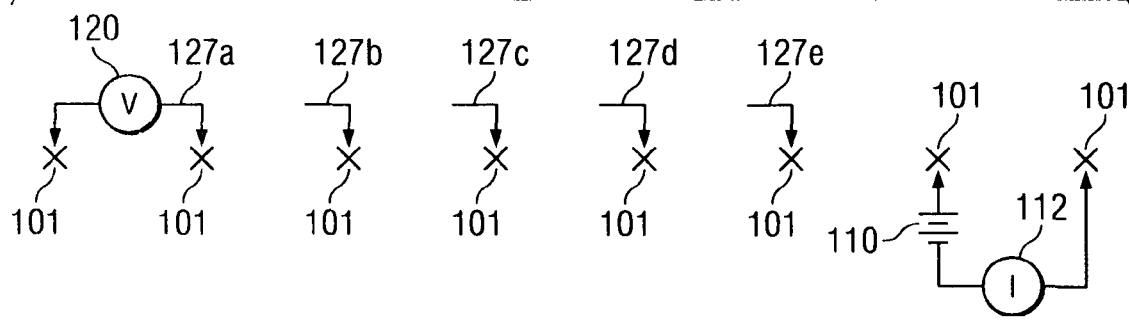

FIG. 3g shows the final position of the ammeter and current source connected between the seventh and eighth electrodes. The volt meter is connected as shown at 127a, 127b, 127c, 127d and 127e and readings are taken at each connection.

Other permutations of connections for injecting current and taking voltage readings between an array of electrodes are envisioned by the invention. Those skilled in the art will recognize that the current can be injected at many different locations in a given array, not only those shown in FIG. 3. All possible permutations are also envisioned as embodiments of this invention.

Figure 4:
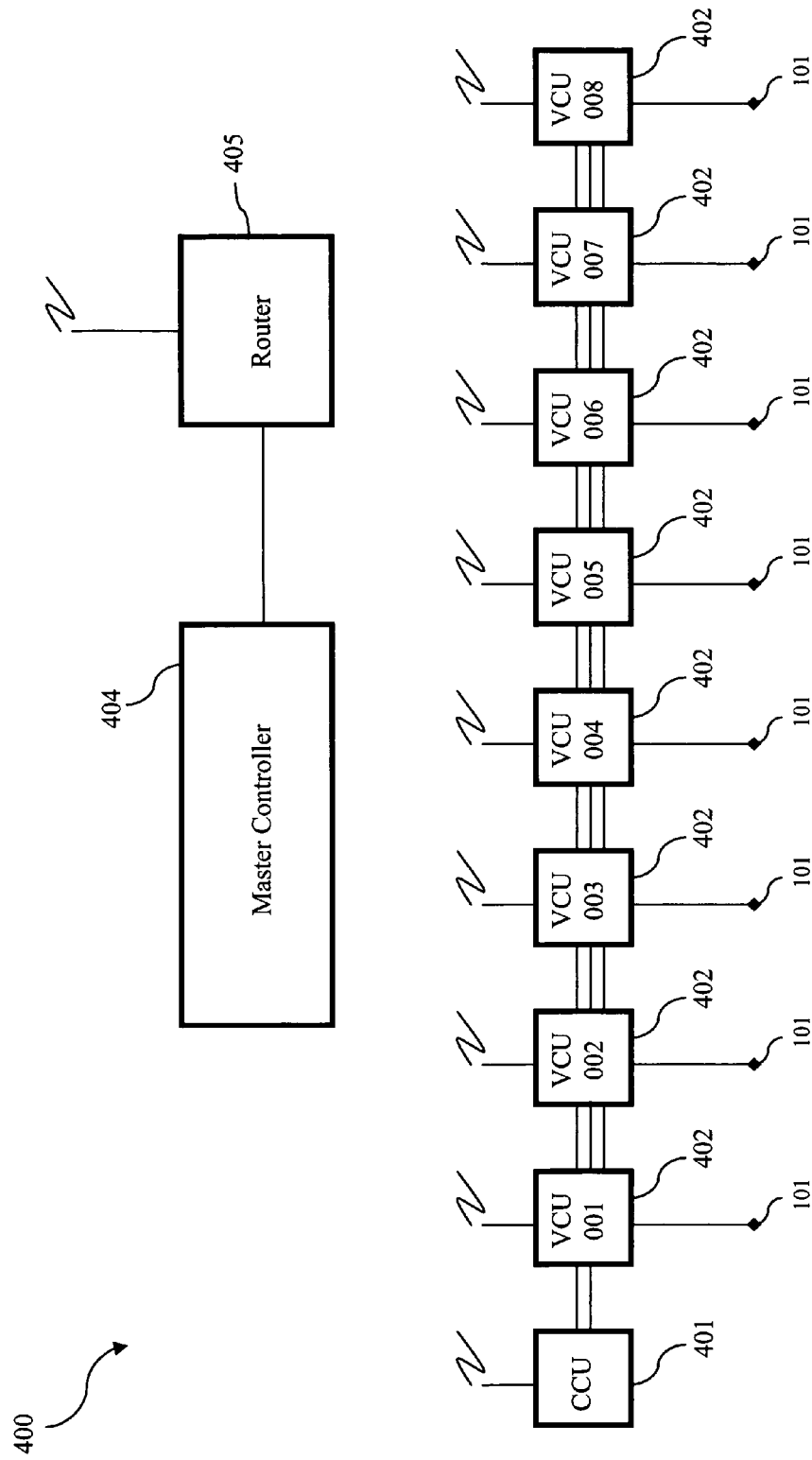
FIG. 4 is a schematic diagram of the apparatus of the current invention.

Moving to FIG. 4, a schematic diagram is shown of the novel apparatus of the invention which allows for a dynamically reconfigurable node to distribute current and take voltage readings in an array of electrodes. System 400 includes a current control unit 401, and an indeterminate number of voltage control units 402. Voltage control units 402 include the sensors required to take voltage readings from and impress current into the electrodes. Current unit 401 is connected to the first voltage control unit 402 by a two-conductor cable. In the preferred embodiment, the cable is a flexible cable such as an extension cord capable of carrying approximately 20 amps. Current control unit 401 also includes a wireless data connection to master controller 404. Master controller 404 is typically a Pentium class laptop personal computer running an operating system such as Windows. Master controller 404 is connected to wireless router 405. The wireless router is capable of communication with each voltage control unit and current control unit nearly simultaneously. Voltage control units 402 are connected to each other with a three-connector cable. In the preferred embodiment, at least two of the conductors must be capable of carrying approximately 20 amps of current for distribution of the current provided by the current control unit. Each voltage control unit also includes a wireless communications link for transmission of data to and receipt of control signals from master controller 404. Each voltage control unit is also connected to an electrode 101 impressed into the ground.

Figure 5:
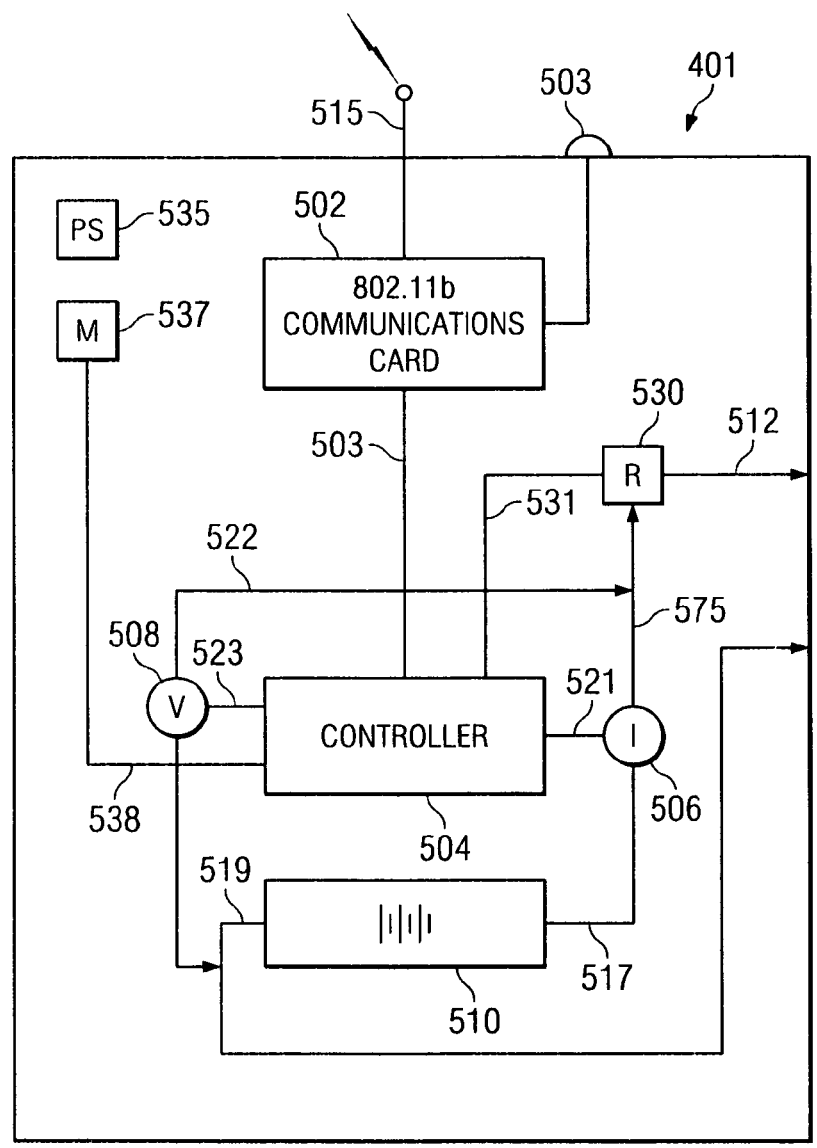
FIG. 5 is a schematic diagram of a current control unit for supplying current and transmitting test data.

Referring to FIG. 5, a diagram of the construction of the current control unit is shown. Current control unit 401 includes a current source 510 to provide current to be impressed in the electrodes. In the preferred embodiment, current source 510 is a 12-volt deep cycle marine battery capable of storing 160 hours of cranking time at approximately 20 amps. In other embodiments, an array of control batteries can be used connected in parallel. In other embodiments, a stable current source can be derived from an AC outlet, as well known in the art.

Current source 510 is connected to digital ammeter 506 through line 517. Digital ammeter 506 is in turn connected to relay 530. Current source 510 passes through ammeter 506 and relay 530 to connector 512 when relay 530 is engaged. Data from digital ammeter 506 is communicated to controller 504 to data line 521. Digital volt meter 508 is connected between current source 510 at line 519 and ammeter 506 at line 522. Readings from digital volt meter 508 are communicated to controller 504 through data line 523.

Digital volt meter 508 is included to accurately measure the drop in voltage created by the shunt resistor in ammeter 506 and the impression of current into the ground when the apparatus is in use. Volt meter 508 produces a reference voltage for accurate operation of the voltage control units.

Controller 504 communicates with wireless card 502 through data line 503. Wireless card 502 conforms to IEEE standard 802.11 and the preferred embodiment includes a card conforming with standard 802.11b and 802.11g operating at a 2.4 gigahertz band. In operation, the throughput of the wireless communication card is between 5.9 and 7.1 megabits per second over a UDP connection.

Controller 504 in the preferred embodiment is an 8 bit PIC10 architecture available from PICmicro of Chandler, Ariz. The particular microcontroller of the preferred embodiment has 256 k of onboard memory with 10-base T Ethernet compatibility. The controller also supports USB connection for upload and download of data and instructions. In the preferred embodiment, memory 537 is also connected to controller 504 through connection 538. In the preferred embodiment, current control unit 401 also includes a rechargeable battery power source 535 for supplying operating current to communications board 502, digital ammeter 506, digital volt meter 508 and controller 504. Communications card 502 is provided with an external antenna 515 to support wireless communication.

Relay 530 is connected to controller 504 through connection 531 in response to a control signal from controller 504. The relay connects lines 575 with connector 512 or disconnects line 575 from connector 512.

Figure 6:
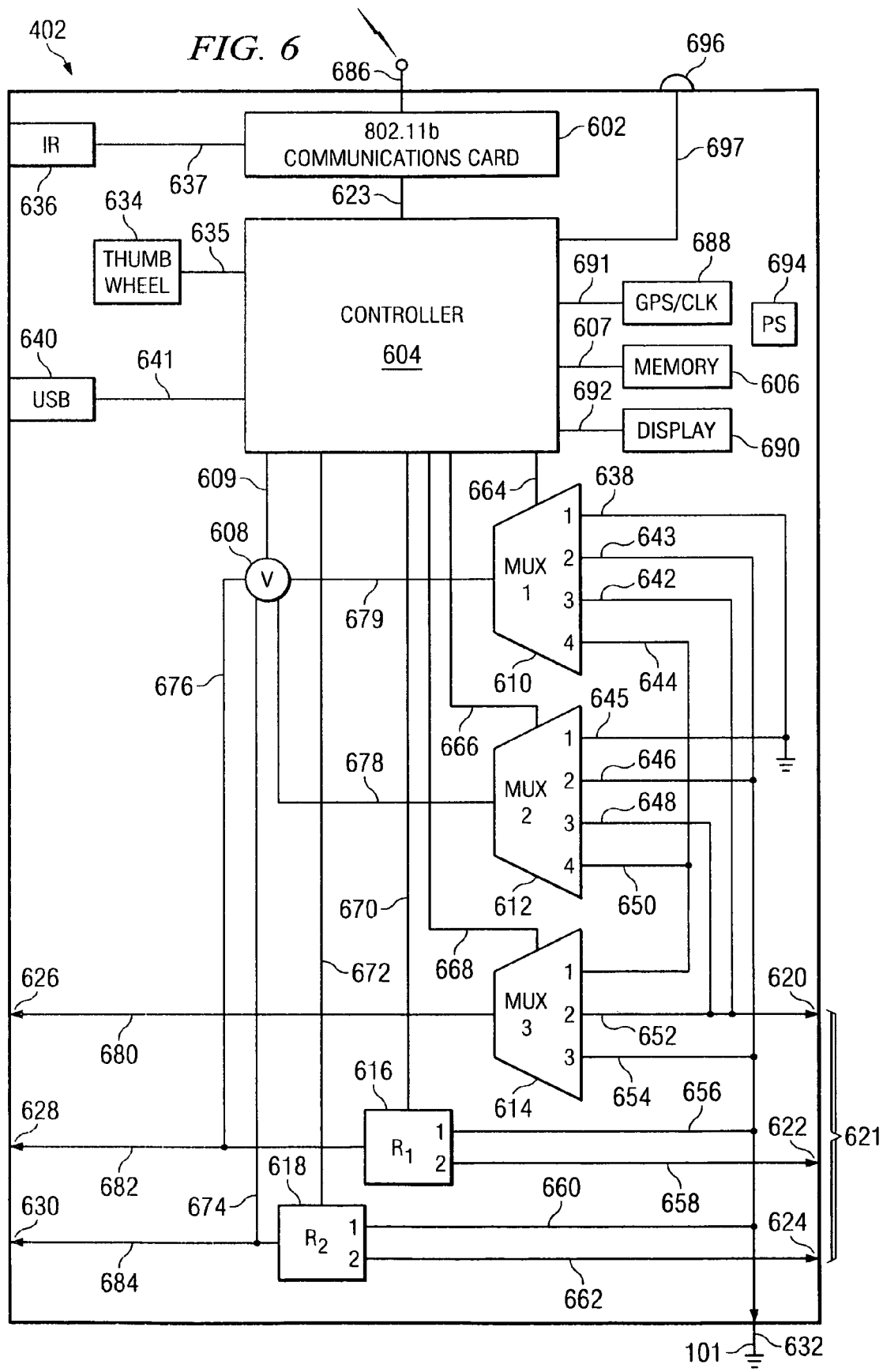
FIG. 6 is a schematic diagram of a voltage control unit for gathering and transmitting measurement data from an electrode.

FIG. 6 shows a schematic diagram of a typical voltage control unit 402. Voltage control unit 402 includes controller 604. Controller 604 in the preferred embodiment is an 8 bit PIC10 architecture available from PICmicro of Chandler, Ariz. The particular microcontroller of the preferred embodiment has 256 k of onboard memory with 10-base T Ethernet compatibility. The controller also supports USB connection for upload and download of data and instructions. In the preferred embodiment, memory 606 is also connected to controller 604 through connection 607. In the preferred embodiment, voltage control unit 402 also includes a rechargeable power source 694 for supplying operating current to communications board 602, digital volt meter 608, controller 604, GPS card 688, display 690 and other associated discrete components. Controller 604 is also connected to external indicator light 696 through control line 697.

Controller 604 is connected to multiplexer 610 through control line 664, multiplexor 612 through control line 666, and multiplexer 614 through control line 668, relay 616 through control line 670, and relay 618 through control line 672. Controller 604 is also connected to digital volt meter 608 through control line 609, USB communications port 640 through control line 641, thumbwheel switch 634 through control line 635, communications card 602 through control line 623, GPS receiver 688 through line 691, memory 606 through control line 607 and display 690 through control line 692. Communications card 602 is provided with an external antenna 686.

Multiplexer 610 is connected to digital volt meter 608 through control line 679. The signal from control line 679 is distributed among open node 638, control line 643, control line 642 and control line 644 via control signal from controller on control line 664. In its first position, line 679 is connected to open node 638 which connects the volt meter to system ground. When multiplexer 610 is in its second position, line 679 is connected to control line 643 connecting the volt meter to probe 101 through connector 632. In its third position, multiplexer 610 connects volt meter 608 to line 652 and external connection 620. When in its fourth position, multiplexer 610 connects volt meter 608 to line 679 to line 644 which in turn connects the first position of multiplexer 614 to external connector 626 through line 680.

Volt meter 608 is connected to multiplexer 612 through line 678. In its first position, multiplexer 612 connects volt meter 608 and line 678 to line 645 and internal ground. In its second position, multiplexer 612 connects line 678 and volt meter 608 to line 646 for connection to connector 632 and electrode 101. In its third position, multiplexer 612 connects line 678 and voltage meter 608 to line 648 which is in turn connected to connector 620. In its fourth position multiplexer 612 connects volt meter 608 and line 678 to line 650 for connection to line 680 and connector 626 through multiplexer 614. Multiplexer 612 receives instructions from controller 604 through line 666.

Multiplexer 614 connects line 680 and external connector 626 in its first position to multiplexer 612 through line 650 and multiplexer 610 through line 644. In its second position, multiplexer 614 connects line 680 to line 652 for a through connection between connector 626 and 620. In its third position multiplexer 614 connects line 680 to line 654 for connection to external connector 632 and electrode 101.

Relay 616 is connected to controller 604 through control line 670 and receives control signals through that line. Relay 616 serves to connect line 682 and external current connector 628 to either line 656 for further connection to external connector 632 and electrode 101 or line 658 for a through connection to external current connector 622.

Relay 618 is connected to controller 604 through control line 672 and receives control signals from that line. Relay 618 connects line 684 and external current connector 630 to either line 660 for connection to external connector 632 and electrode 101 or line 662 for a through connection to current connector 624.

Volt meter 608 is connected to line 682 through test line 676 and line 684 through test line 674. Volt meter 608 receives a baseline voltage bias from the current being carried on conductor 682 and 684. The bias voltage is used as a baseline from which voltage readings are taken.

Controller 604 is connected to standard USB communications port 640 for receipt of charging current to charge power supply 694 and to receive instructions or upload data from memory 606.

Thumbwheel 634 in the preferred embodiment is a set of three rotary switches each having ten positions for a total of 1000 possible encoded numbers. Thumbwheel 634 in the preferred embodiment incorporates a switch card matrix which allows controller 604 to read a digital number between 000 and 999 corresponding to the settings of each wheel on the thumbwheel. In alternate embodiments, such as those built for extremely harsh outdoor conditions, the thumbwheels can be replaced by sealed push button switches or omitted altogether in favor of any electrical method to set the address of the voltage control unit.

IR port 636 includes an infrared sensor (not shown) and is used to communicate infrared signals through control line 637 to communications card 602 for programming of controller 604 through control line 623.

External indicator light 696 in the preferred embodiment has a high intensity LED used to act as a remote signal if the voltage control unit or cabling fails. Alternate embodiments envision multiple indicator lights each indicating a different error condition on the voltage control unit.

Display 690 in the preferred embodiment is a six-digit LED display with seven segments per digit. GPS card 688 in the preferred embodiment is a GPS engine board available from Royaltek. In the preferred embodiment the part number is REB-22R, including a NMEA-0183 compliant protocol and also a GPS core clock source.

Figure 13:
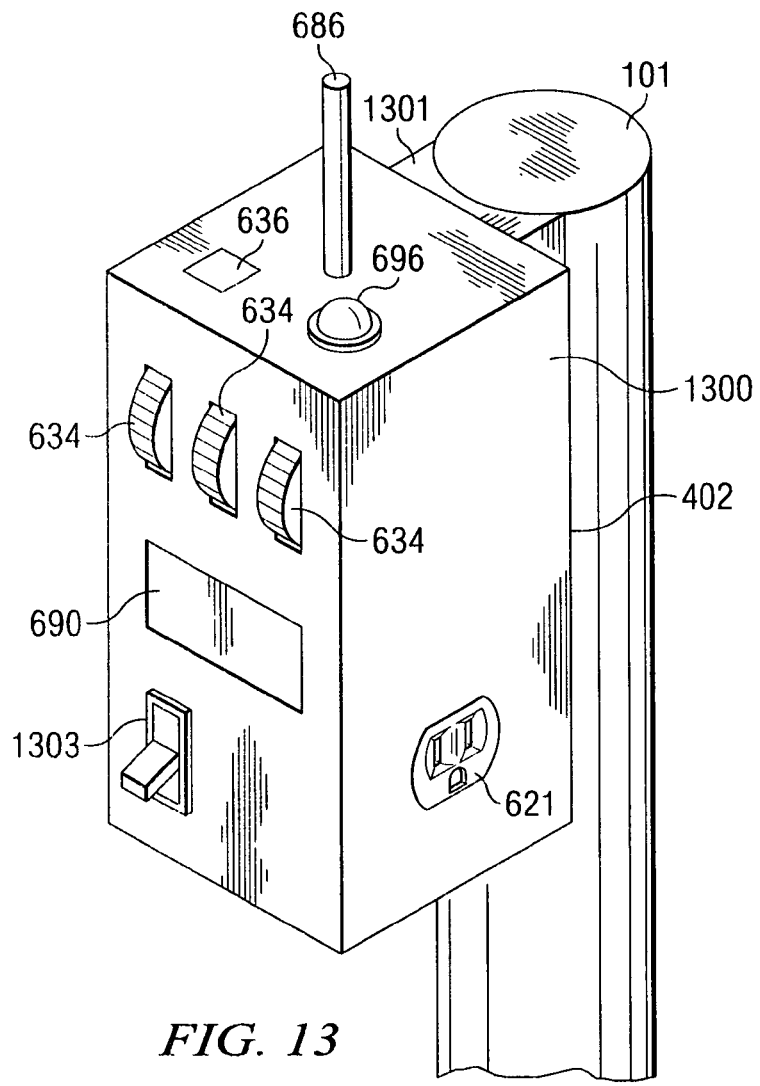
FIG. 13 is an idealized schematic drawing of the exterior of a voltage control unit of the current invention.

FIG. 13 shows a physical embodiment of a typical voltage control unit 402. Voltage control unit 402 in the preferred embodiment is enclosed in a NMEA compliant package 1300. Thumbwheel 634 can be seen as well as display 690. IR port 636 as well as external indicator light 696 can be seen affixed to the top of the unit. Connector 632 in the physical unit includes a concave stainless steel connector block 1301. In practice, connector block 1301 is bolted to electrode 101. Also of interest in FIG. 13 is the physical connector at 621. In the preferred embodiment, the physical connector is a standard three-prong outlet such as that used in the United States to facilitate use of standard extension cord cables for carrying current through each of the voltage control units.

In practice, the system of the master controller, current control units, voltage control units and electrodes must all be deployed before use.

The electrodes are typically deployed in an array. The location for each electrode in the array may, in one embodiment, determined using methods known in the art. Typically, these methods include surveying or measuring a straight line and placing electrodes at known distances from a starting point. However, the invention provides a newer alternative to the prior art method as will be fully discussed later.

Figure 14:
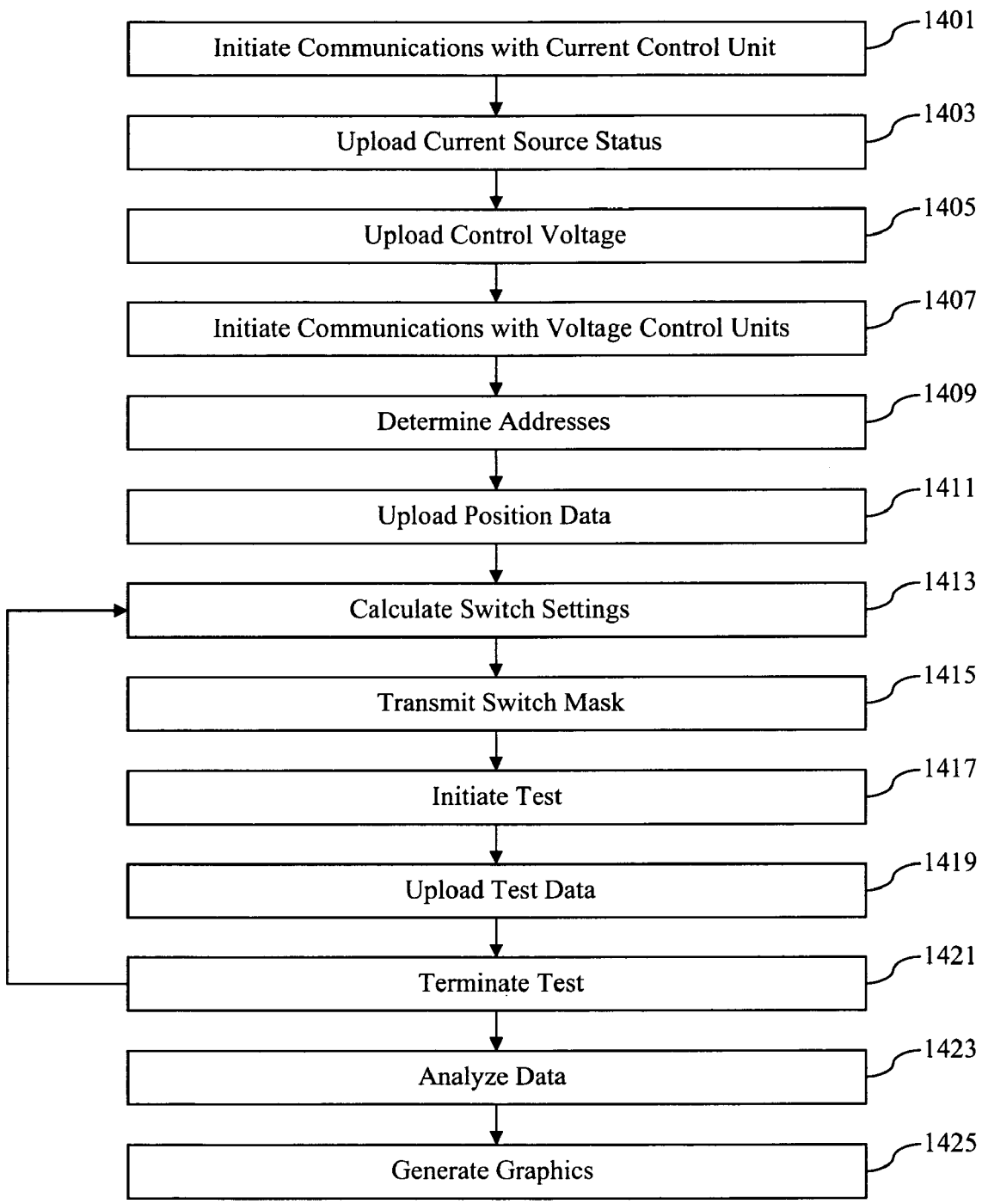
FIG. 14 is a flow chart of a data collection analysis program run by the master controller of the present invention.

In operation, once the deployment of the system and array of electrodes are deployed, master controller 404 executes a program which initiates communication with each of the current control units and voltage control units and then automatically configures and reconfigures the switch settings at each voltage control unit to achieve an optimal testing pattern and eliminate all error conditions in the system and array. The program steps of the preferred embodiment are shown in FIG. 14. At step 1401, the master controller initiates communications with the current control unit. At step 1403, the master controller uploads the status of the current source from the current control unit and then uploads the reference voltage read by volt meter 508 and at step 1405 data transfer takes place via the wireless 802.11 cards.

At step 1407, the master controller initiates communications with all deployed voltage control units. Addresses for each voltage control unit are then determined at step 1409.

The way in which addresses are determined for each voltage control unit is dependent on the embodiment chosen of the current invention. In a first embodiment, known as the "thumbwheel" method shown in FIG. 8, thumbwheels 634 are used to set an address number between 000 and 999 manually on each voltage control unit. In this case, the master controller is supplied internally with a table that maps known addresses between 000 and 999 to physical locations of electrodes in the array.

In a similar method, known as the "IR (infrared)" method, IR port 636 on the voltage control units are used to communicate and address to controller 604 via communication card 602. The IR port receives the address via a handheld PDA programmed to uniquely assign addresses to the voltage control units, according to a table. The identical table is used by the master controller to mathematically correlate the data received from each voltage control unit with its physical location. In an alternate embodiment, the address of each voltage control unit is permanently stored in memory 606 and is unique to each voltage control unit. When approached by a handheld PDA, the infrared port is accessed and reports the unique address stored in memory to the PDA. A table in the PDA is populated with voltage control unit addresses in order of deployment in the array and correlated with the unique position of each voltage control unit. The table is then uploaded from the PDA to the master control unit via the IR port on each machine. The updated tables are used by the master control program to correlate the addresses of the voltage units with their physical locations.

In a second embodiment, known as the "first-to-wake" method, the order of deployment of the voltage control units is used to set the addresses of each. In this embodiment, the first voltage control unit to "wake up" or come on line is addressed by the master control unit who assigns an address to it. Since the addresses are assigned in a physical order, the master controller is aware of the spatial relationship of the voltage control units. In most applications the interstitial distance between the electrodes is the same, or nearly the same. In this embodiment, once the electrodes are deployed then the voltage control units are deployed, one per electrode. The voltage control units are deployed in order starting from a first proximal position and proceeding linearly along the line of deployment of the electrodes to the most distal electrode position. After each voltage control unit is attached to its electrode, it is activated through switch 1303. In this method, the voltage control units must be activated in the order in which they are installed and they must be installed in a linear path from beginning to end along the line of deployment. In this example, and referring to FIG. 4, the voltage control units would be activated in order 1, 2, 3, 4, 5, 6, 7 and finally 8.

In a third embodiment, known as the "GPS location method", the voltage control units determine their longitude and latitude location provided by the GPS card as they are switched on. This longitude and latitude location is then uploaded to the master controller along with a unique address stored in the memory of each voltage control unit. The addresses are correlated with physical locations by the master controller and used to coordinate the functions of the voltage control units and measurements returned from them. Moving to step 1411, if necessary, the master control program uploads position data from each of the voltage control units.

Entering a loop at step 1413, the master controller calculates switch settings to determine a "switch mask". A switch mask is then uploaded to each of the voltage control units at step 1415. Two examples of switch masks are shown at FIG. 15.

Referring then to FIG. 15 and FIG. 3, a switch mask for position 121*a* for each voltage control unit 1 through 8 and each multiplexer and relay in each voltage control unit can be seen for two permutations. From voltage control unit 1, multiplexer 610 will be in position 1, multiplexer 612 will be in position 1, multiplexer 614 will be in position 2, relay 616 will be in position 1 and relay 618 will be in position 2. Voltage control unit 2 will have multiplexer 610 set to position 1, multiplexer 612 set to position 1, multiplexer 614 set to position 2, relay 616 set to position 2 and relay 618 set to position 1. Referring to FIG. 3 and FIG. 4, it can be seen that this mask setting for voltage control units 1 and 2 will result in the ammeter 112 and current source 110 being connected to the first and second electrodes.

Returning to FIG. 14, mask 1 shows that voltage control unit 3 will have multiplexer 610 set at position 2, multiplexer 612 set at position 3, multiplexer 614 set at position 2 and relays 616 and 618 set in "don't care" positions. Voltage control unit 4 will have multiplexer 610 set at position 1, multiplexer 612 set at position 1, multiplexer 614 set at position 3, and relays 616 and 618 also set in "don't care" positions. Referring back to FIG. 3 and FIG. 4, it will be recognized that this mask setting for the third and fourth electrodes will result in the voltage meter of voltage control unit 2 being connected between the third and fourth electrodes.

Returning to FIG. 14, mask 1 shows that voltage control units 5, 6, 7 and 8 for all setting that are in "don't care" positions because they will not be used to determine the voltage between electrodes 3 and 4 for this section of the test. In practice, the master controller does not trigger readings from unused voltage control units in an array.

Once data is collected at position 121*a*, the master control unit calculates the mask required to test the voltage at position 121*b* as shown in FIG. 3*a*. Referring to FIG. 14, mask 2 is shown to accomplish this voltage reading. At mask 2, the settings for voltage control units 1, 2 and 3 are unchanged. However, the settings for voltage control unit 4 now are set to "don't care" positions. This is reasonable because as shown in FIG. 3, the fourth electrode is not needed for testing in this permutation.

Mask 2 of FIG. 15 shows that voltage control unit 5 will have multiplexer 610 set to position 1, multiplexer 612 set to position 1, multiplexer 614 set to position 3 and relays 616 and 618 set to "don't care" positions. This mask setting corresponds to position 121*b* shown in FIG. 3. When implemented, it accomplishes connecting volt meter 120 between nodes 3 and 5 as shown in FIG. 3a.

Returning to FIG. 14, once a switch mask has been transmitted, the master controller initiates a test at step 1417. In this step, the master controller sends s signal to the current control unit instructing it to close relay 512 which sends current to the voltage control units. The master controller then initiates a short delay to allow the voltages to stabilize in the electrodes of the array. At this step, the current control unit measures the reference voltage with volt meter 508 and transmits it to the master controller. Signals are then sent to each voltage control unit to initiate a test. The initiate test signals are sent virtually simultaneously by the master controller. After the initiate test signal is sent to all participating voltage control units, each of the voltage control units then takes a series of data readings and stores them in local memory.

At step 1419, the master controller uploads test data from each of the participating voltage control units. At step 1421, the test is terminated and the master controller returns to step 1413 to calculate additional switch settings and repeat the process.

Figure 11:
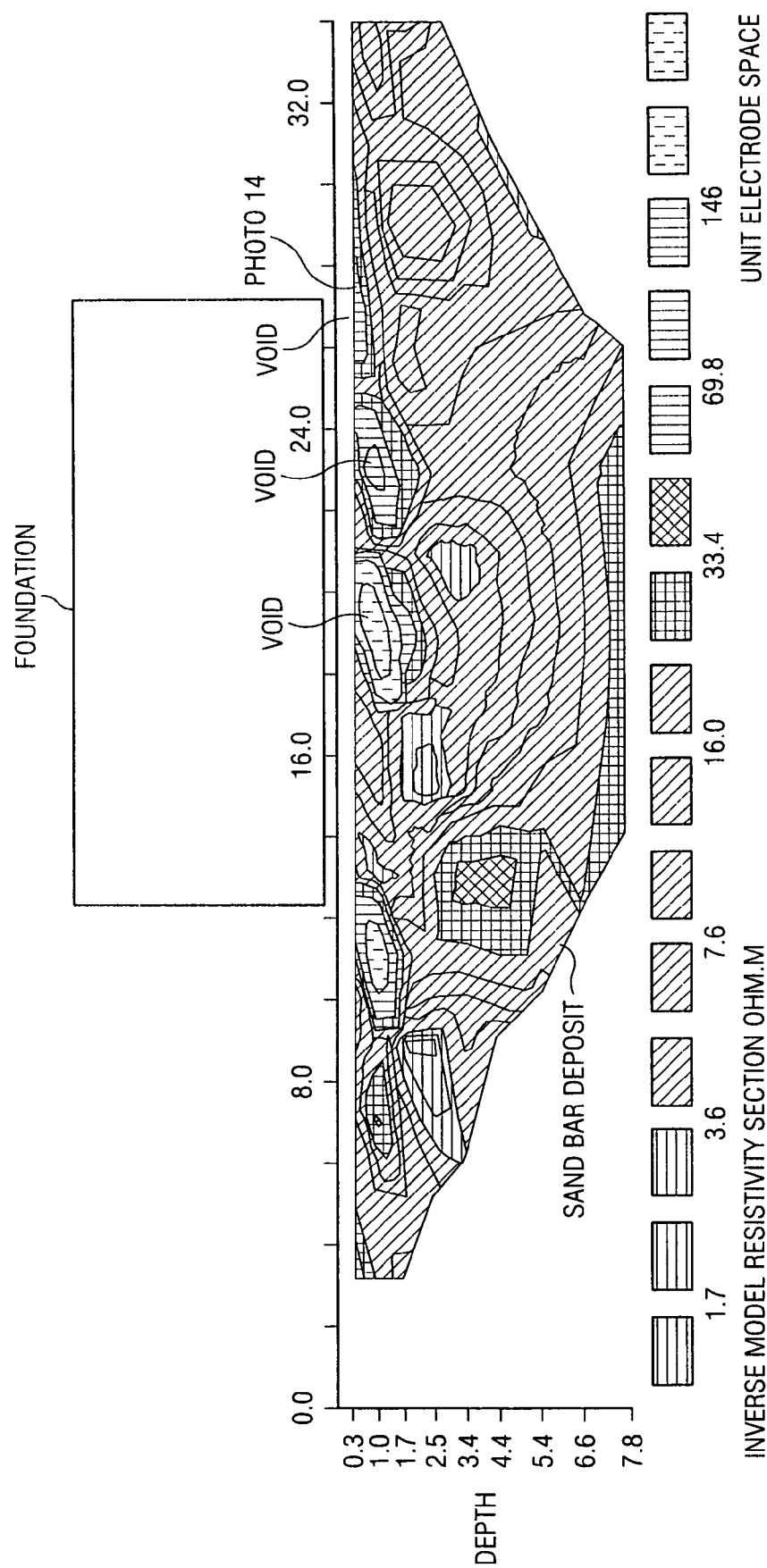
FIG. 11 is an example of a first resistivity model.
Figure 12:
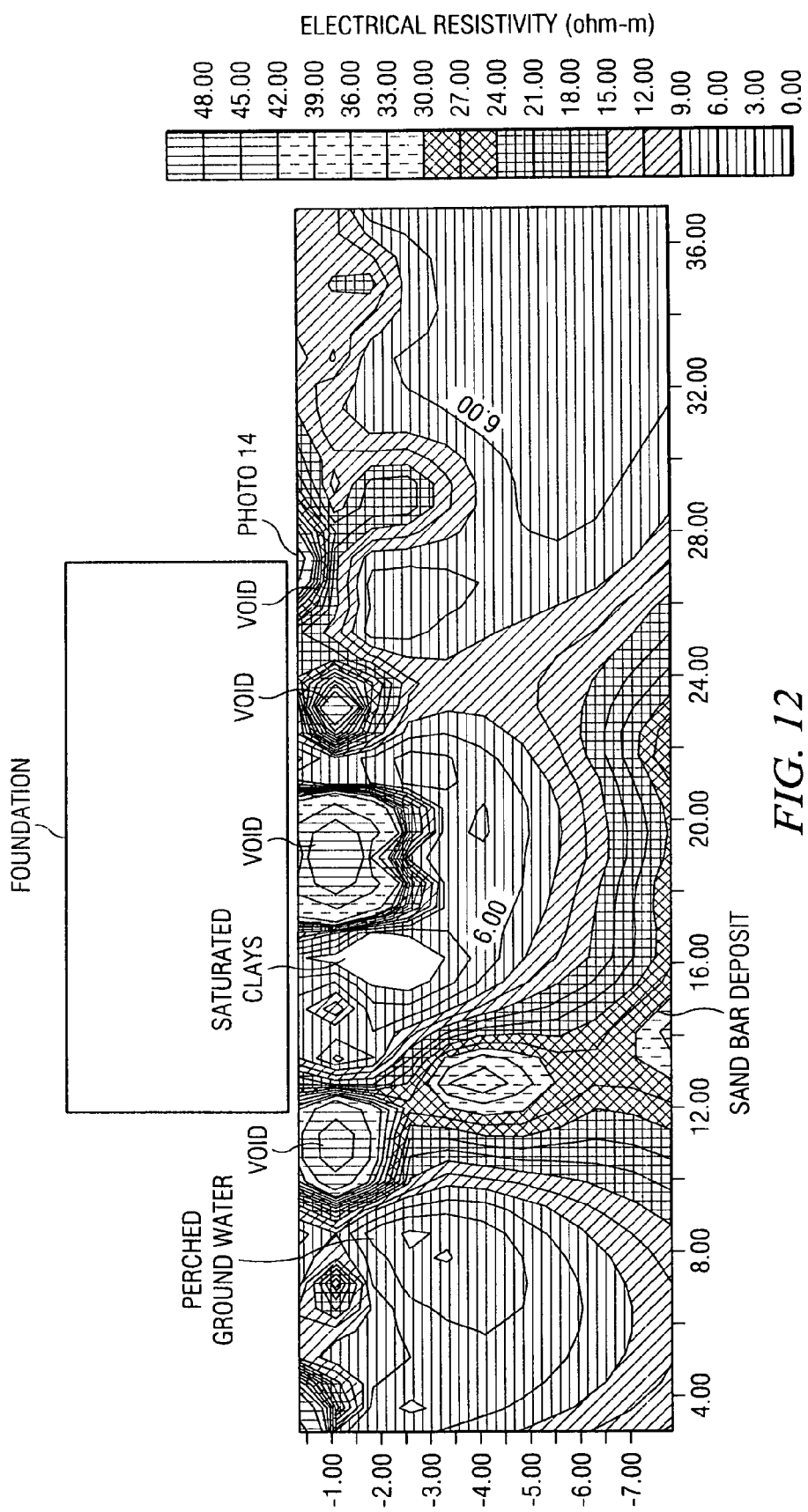
FIG. 12 is an example of a second resistivity model.

After terminating all tests, the master controller analyzes the data as has been described to arrive at potential maps as shown in FIGS. 11 and 12. At step 1425, time-stamped data can be used to generate 3-D graphics which "move" from time-stamp to time-stamp in a fashion which can indicate the direction of flow of ground water or other subsurface anomalies.

Figure 16:
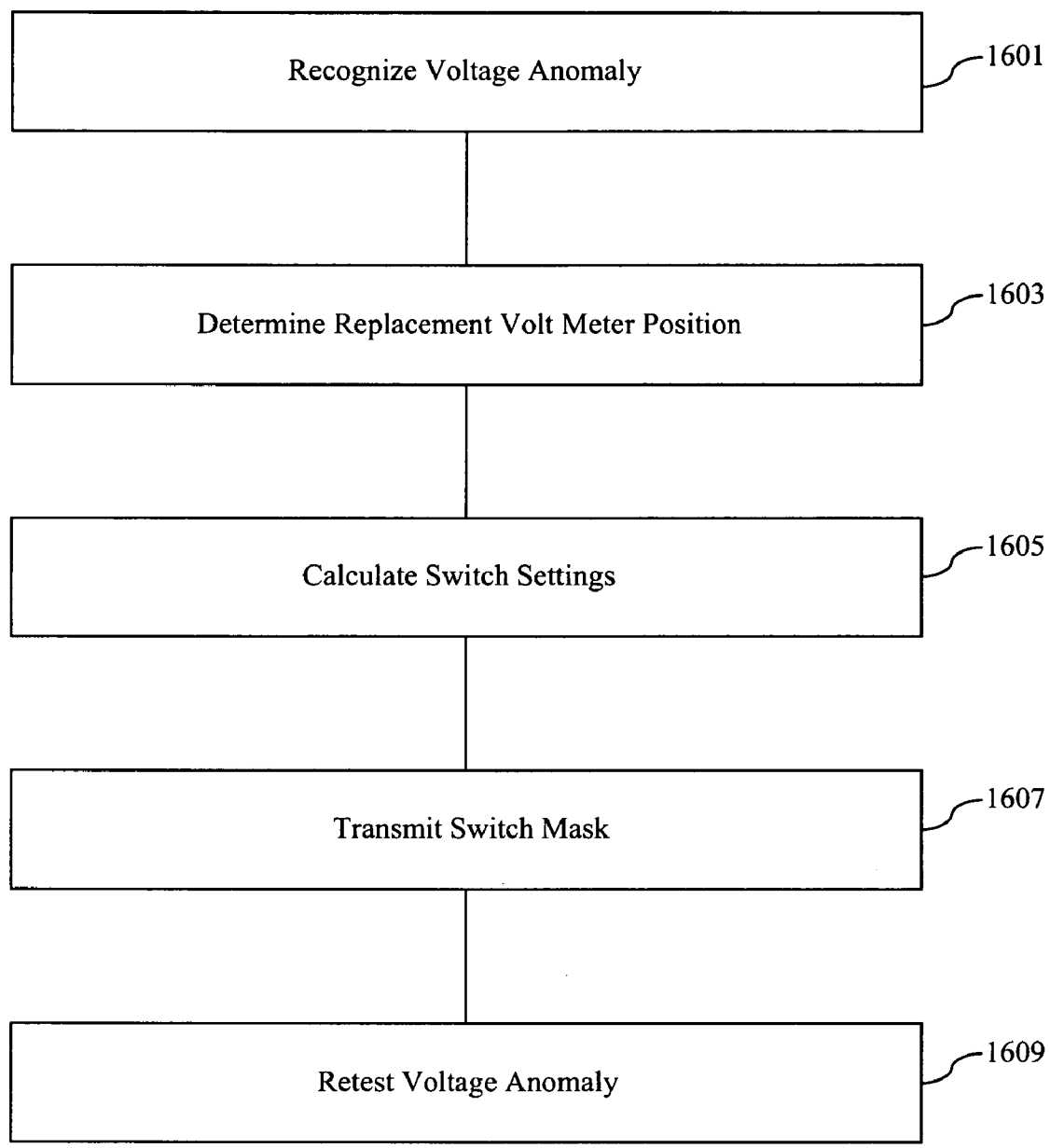
FIG. 16 is a program listing of a subroutine run by the master controller to automatically reconfigure a series of voltage control units of the present invention to avoid errors.

Those skilled in the art will recognize that each voltage control unit is designed in a robust fashion which allows for reconfigurable use. For example, if a voltage anomaly is recognized at one particular voltage control unit during a test procedure, it can be assumed by the master controller that voltage meter 608 in that particular voltage control unit is bad. In order to re-test the anomaly, the system can be reconfigured as shown in FIG. 16. In FIG. 16, a voltage anomaly is recognized at step 1601. At step 1603, the master controller determines a replacement volt meter position. A logical substitute volt meter position is either the volt meter immediately upstream or downstream from the defective volt meter. However, the volt meter in any other voltage control unit may be used. The master controller then calculates switch settings to use the alternative volt meter at step 1605 and transmits a switch mask to the voltage control units, instructing them to connect the alternate volt meter accordingly at step 1607. The master controller then retests the voltage anomaly at step 1609 and records the results.

Those skilled in the art will also recognize that the robust design of the invention allows for cabling integrity to be tested by each volt meter and each voltage control unit. By assessing whether the reference voltage communicated to volt meter 608 through lines 676 and 674, each voltage unit can determine if the connection to the cabling and the integrity of the cable itself is proper. If not, indicator light 696 is lit and an error condition can be reported to the master controller, signaling a need for cable replacement or reconnection.

Those skilled in the art will also recognize that the robust nature of the system of the invention allows for easy replacement of any component part. For example, a voltage control unit might fail because of physical damage or software failure during use. In this condition, the indicator light 696 is lit, allowing operators to locate defective units in what can be a vast array of sensors. To correct the condition, a replacement voltage control unit can be added to the system and given the same address as the damaged voltage control unit. In the easiest case, thumbwheel 634 can simply be set to the physical address assigned to the damaged voltage control unit.

Upon inclusion in the system, the master controller will treat the replacement voltage control unit exactly the same as the one which was damaged. Those skilled in the art will immediately recognize the advantage over systems which require unique sensors adapted for each discrete physical location. In these prior art systems, the entire system must be replaced in order to achieve readings from an entire grid.

Figure 17:
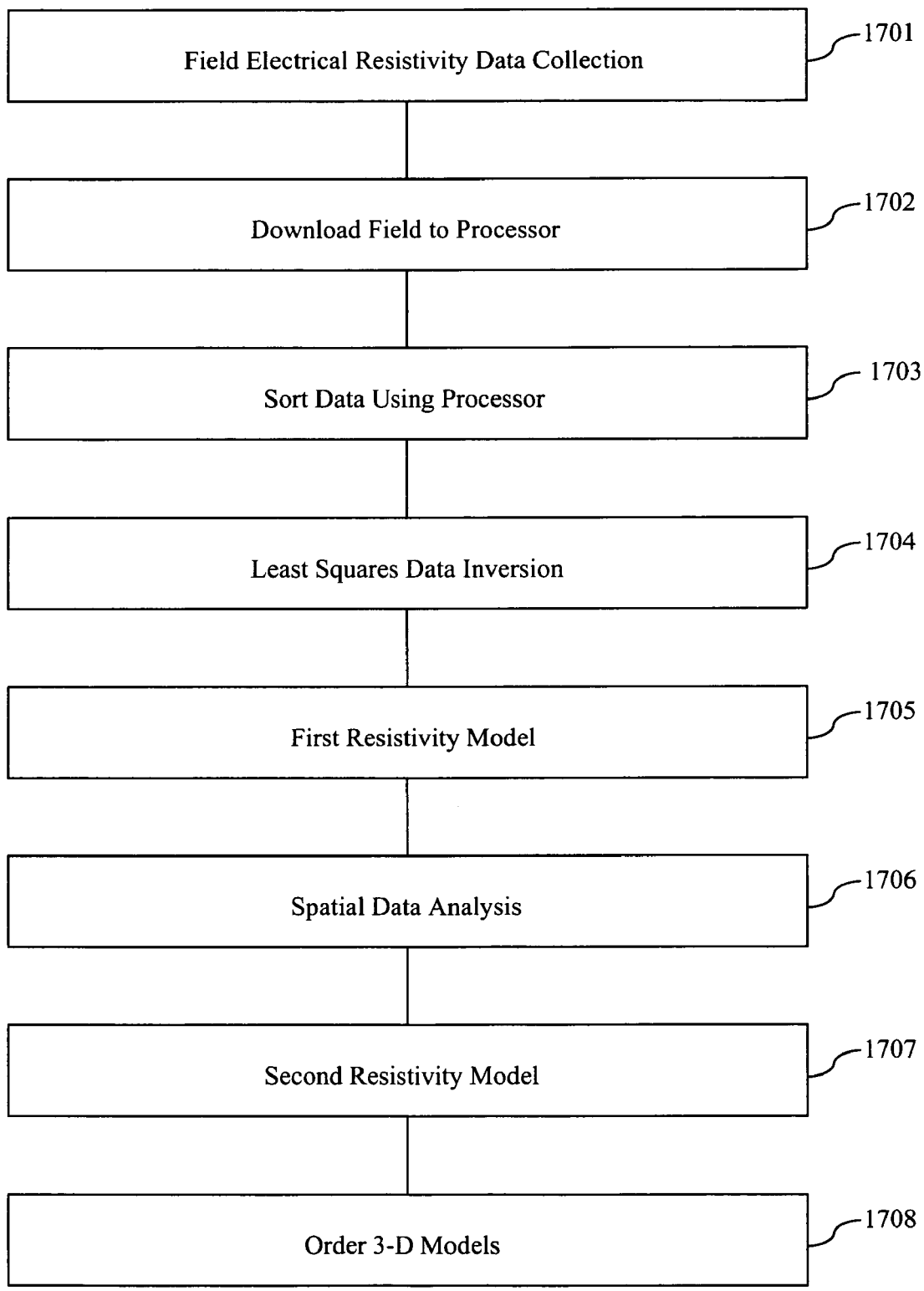
FIG. 17 is a subroutine executed by the master controller in one embodiment of the invention.

In analyzing the data at step 1423, the steps at FIG. 17 are followed. Referring to FIG. 17, a flow chart is shown depicting the steps involved in producing the subgrade resistivity map. Step 1701 uses the equipment described above to perform field electrical resistivity data collection. Potential and current measurements are downloaded, using, for example, STINGDMP software, available from SAGA Geophysics, to the master controller in Step 1702. The master controller calculates electrical resistivity from the measured voltage and current according to the following equation:

where $K$(an electrode geometric constant)=the area of current flow·div·the length of the current path.

The master controller also calculates, based on the known locations of the current and voltage electrodes, the virtual data point locations corresponding to the calculated resistivity values. The reference voltages downloaded from the current control unit and the voltage control unit are sued to calibrate the readings from the voltage control units. Thus, in Step 1703, the master controller, using SWIFTCNV software from SAGA Geophysics, or an equivalent, sorts the location and resistivity data into a number of discrete sets, each consisting of a spatial set of coordinates and a resistivity value at those coordinates.

Next, in Step 1704, the master controller performs a least squares data inversion analysis on the location and resistivity data to create a first electrical resistivity model (Step 1705). To perform this least squares data inversion, software such as RES2DINV by SAGA Geophysics may be used; however, a number of programs are available that can perform the least squares inversion and produce a two- or three-dimensional graphical output. This first electrical resistivity model minimizes the error of the field data. FIG. 11 is an example of a two-dimensional color graphical output of the least squares data inversion analysis of Step 1705. FIG. 4 shows ill-defined voids and subsurface features such as a sandbar.

The next step, Step 1706, is to perform a spatial data analysis using geostatistical methods, such as kriging. Step 1706 produces a second electrical resistivity model (Step 1707) that minimizes the error of the spatial variability of the first electrical resistivity model. SURFER is a typical commercially-available geostatistical analysis program; however, any geostatistical analysis program may be used. Again, the output is typically a two- or three-dimensional graphical representation of location and resistivity. FIG. 12 is an example of a two-dimensional color graphical output of the kriging analysis. FIG. 12 shows with much greater clarity voids saturated soil, ground water and sandbar deposits.

Due to the rapid collection of data made available by the present invention, three-dimensional "movies" of the graphical output of data can be achieved by ordering three-dimensional models in time. At Step 1708, the master controller uses commercially available software to build movies out of ordered sets of three-dimensional data. The movies allow recognition of flow patterns which can allow correction of problems on location where the system is used.

Figure 8:
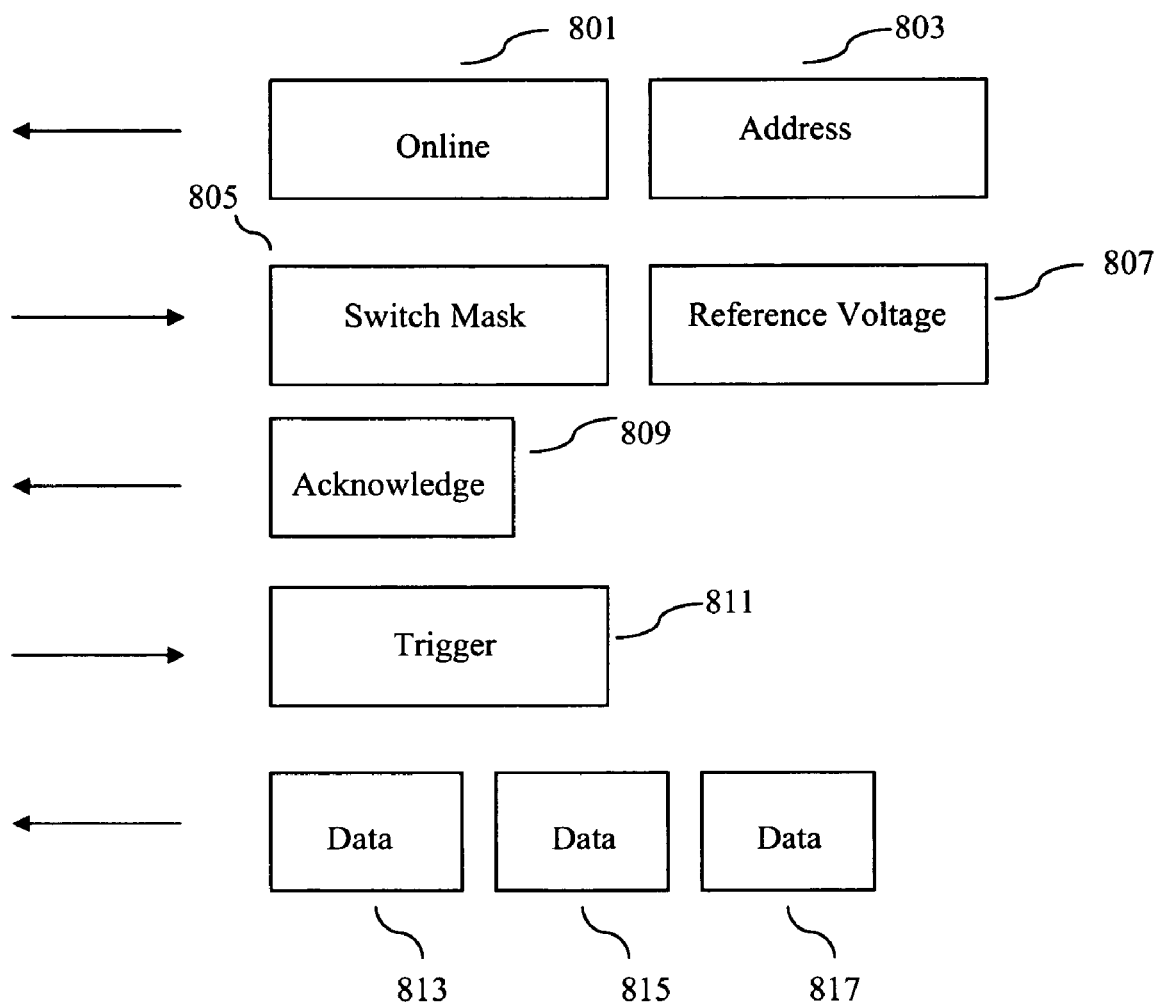
FIG. 8 is the protocol adopted by a voltage control unit in another embodiment of the invention.
Figure 9:
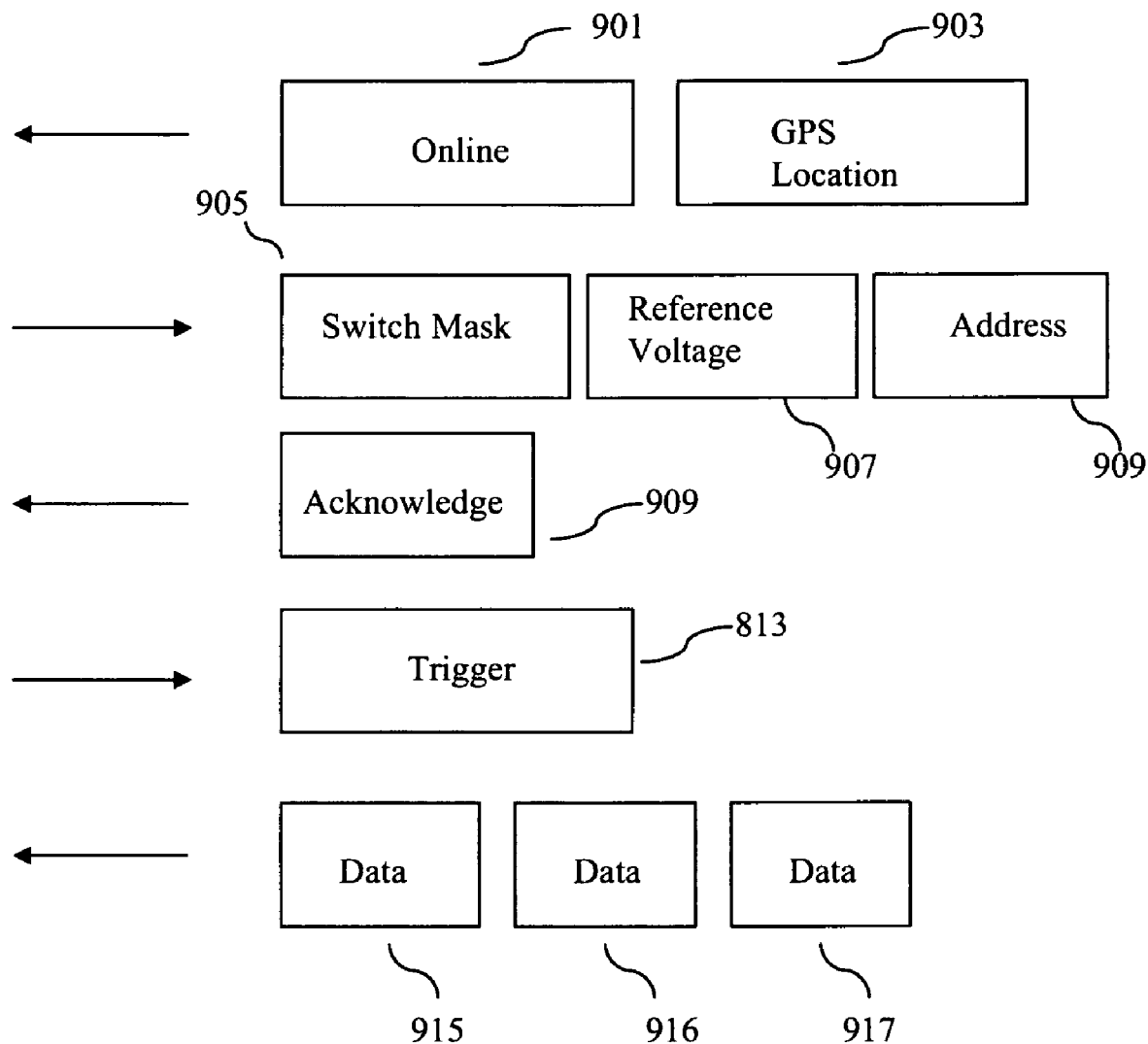
FIG. 9 is the protocol adopted by a voltage control unit in another embodiment of the invention.

Referring to FIGS. 8 and 9, data transmission protocol from between the master controller and each voltage control unit can be seen for three different embodiments.

In FIG. 8, the so-called "thumbwheel" embodiment and "IR set" embodiments, each voltage controller after deployment is switched on. Immediately in step 801 an "on-line" signal is sent to the master controller at block 801. At block 803, an address which has been assigned to the voltage control unit by the thumbwheel or infrared handheld unit is transmitted to the master controller. Block 805 is then downloaded from the master controller including switch masks. A reference voltage block is also downloaded at step 807. The reference voltage is that voltage determined by volt meter 508 and the current control unit and used as an offset to accurately measure the voltage between the electrodes. After receipt, the voltage control unit transmits an acknowledge block back to the master controller at block 809 and goes into a hold mode. Upon receipt of a trigger block 811 from the master controller, the voltage control unit begins a test cycle repeatedly testing the voltage between the two assigned electrodes a predetermined number of times. The voltages are stored in memory 606 and then uploaded upon completion in data blocks 813, 815 and 817.

Figure 7:
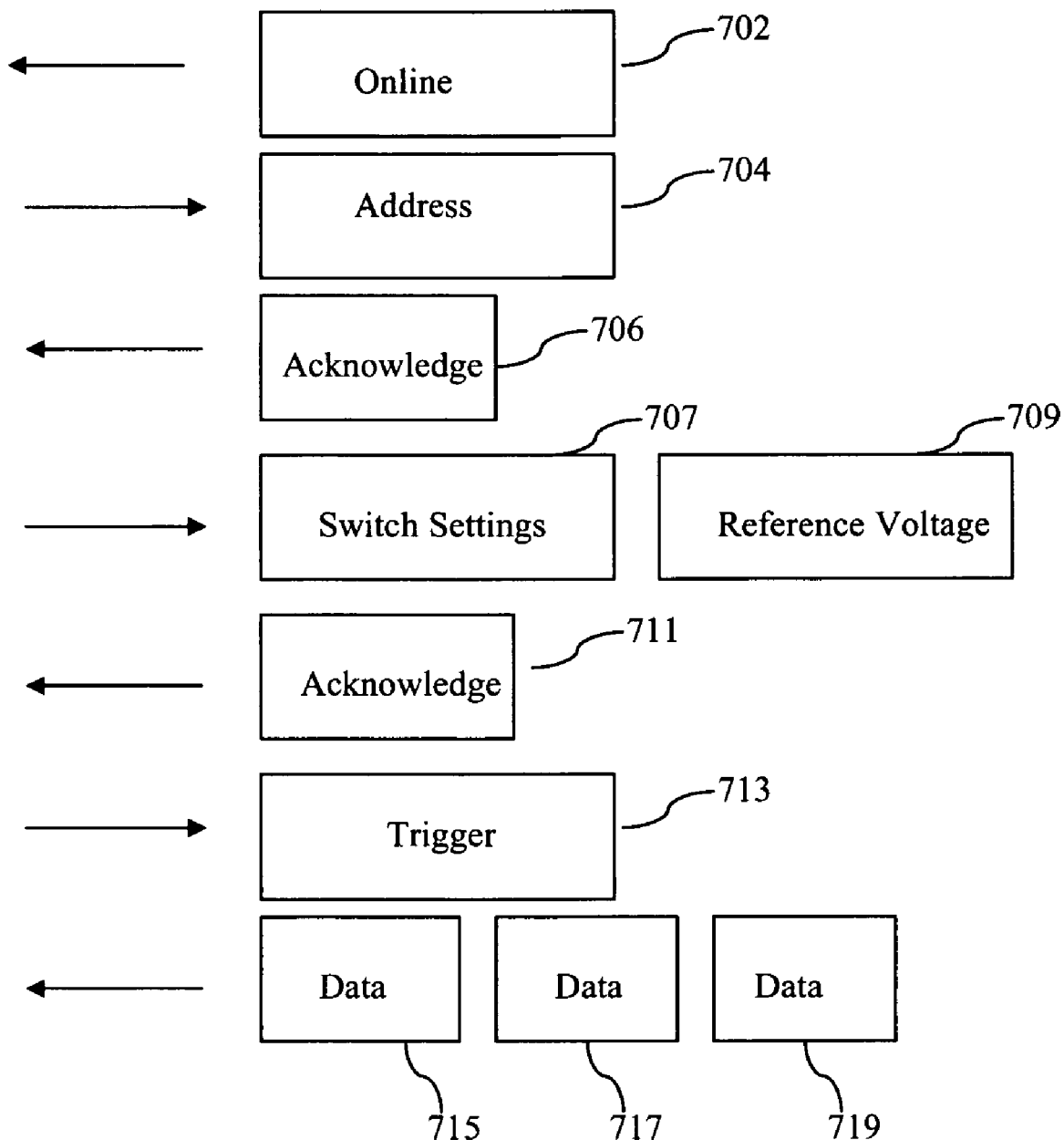
FIG. 7 is the protocol adopted by a voltage control unit in one embodiment of the invention.

In the second embodiment, the so-called "first-to-wake" method, the data protocol for the voltage control unit is shown in FIG. 7. In FIG. 7, the voltage control units are switched on in order. Data block 702 transmits an on-line condition to the master controller. The master controller responds by sending an address 704 which is stored by controller 604 in memory 606 in the voltage control unit. The master controller also transmits a reference voltage at data block 709, the reference voltage being the bias voltage indicated by volt meter 508 in current control unit 401. An acknowledge block 711 is sent by the voltage control unit at block 711. A hold mode is then entered by the voltage control unit. Upon receipt of a trigger block 713, the voltage control unit takes a predetermined number of data samples indicating the voltage between its assigned electrodes. Upon completion, the data blocks 715, 717 and 719 are transmitted to the master controller.

In a third embodiment, the so-called "GPS location" method, the data protocol is shown at FIG. 9. In FIG. 9, each voltage control unit upon activation reads its GPS location from the onboard GPS card 688. It transmits a data block indicating an online position at 901 and a data block containing its GPS location data at 903. The switch mask is downloaded at 905 along with a reference voltage at 907 and an assigned address calculated by the master controller at 909. Upon receipt of the switch mask reference voltage and address data blocks, an acknowledge data block is returned to the master controller at 809. The voltage control unit then enters a hold mode. Upon receipt of the trigger block 811, the voltage control unit takes a predetermined number of data samples which include the voltage at its assigned electrodes. When complete, the data samples are transmitted in data blocks 915, 916 and 917 to the master controller.

In a fourth preferred embodiment, the so-called "electrode locator" method, the positions of each electrode are determined by each individual voltage control unit via signals sent from a GPS card to each display 690 on each voltage control unit. In this embodiment, the location of the electrode is stored in a grid pattern in memory in the master controller. The grid pattern is an array of longitude and latitude locations for each electrode. The coordinates for each electrode are transmitted to the voltage control units determined by their addresses as set by the thumbwheels.

Figure 10:
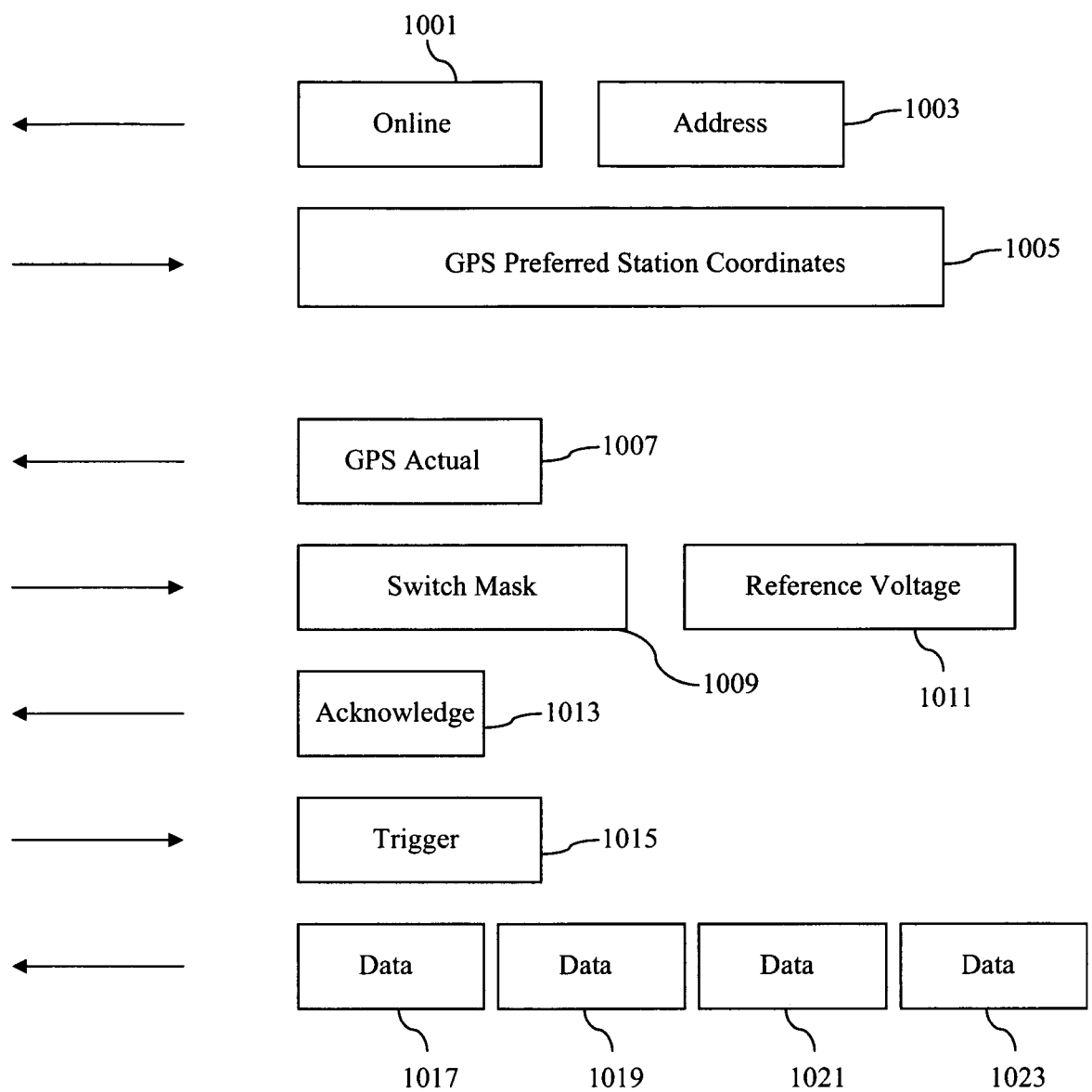
FIG. 10 is the protocol adopted by a voltage control unit in another embodiment of the invention.

Referring to FIG. 10, the communications protocol for the voltage control units is shown for the "electrode locator" method. In this embodiment, when then voltage control units are activated, they immediately send an on-line data block at block 1001 and an address block 1003 as determined by the thumbwheels. The master controller responds by sending a GPS preferred station coordinate data block at block 1005 contention is handled by the communications card. The GPS preferred stations coordinates are then translated to a visible form and displayed on display 690 on the voltage control unit. The actual GPS location is intermittently displayed on display 690 and the voltage control unit is "walked" to the GPS preferred stations coordinates. An electrode is then deposited in the ground and the voltage control unit is connected to it. Upon connection to the electrode, the voltage control unit sends a data block including its GPS actual location at block 1007. Switch masks are downloaded at data block 1009, along with a reference voltage at data block 1011. Upon receipt, an acknowledge block is sent back to the master control unit at block 1013 whereupon the voltage control unit goes into a hold pattern upon receipt of data block 1015, including a trigger signal. Voltage data is taken and transmitted in a predetermined number of samples. The data is transferred in data blocks 1017, 1019 and 1021. A time-stamp for each data block derived from the GPS clock synch signal from GPS card 688 is then transmitted at data block 1023.

The invention claimed is:

1. A system for collecting resistivity data from a subsurface media under the ground surface of the earth comprising:
    a master controller;
    an array of electrodes inserted into the ground surface in direct contact with the subsurface media, having at least a first electrode and a second electrode;
    the array of electrodes positioned in two dimensions in a generally horizontal plane generally parallel to the ground surface;
    a current control unit, in data communication with the master controller, for providing an injection current;
    a set of interconnected voltage control units connected to the array of electrodes and in data communication with the master controller;
    the first voltage control unit further connected to the current control unit;
    the set of interconnected voltage control units cooperating to reconfigurably dispense the injection current into the array of electrodes; and
    the set of interconnected voltage control units further cooperating to reconfigurably measure the voltage among the array of electrodes.

2. The system of claim 1 wherein the current control unit further comprises:
    a current source; and
    a relay means, connected to the current source, to correct the current source to the first voltage control unit.

3. The system of claim 2 wherein the current control unit further comprises a controller means, connected to the relay means for activating the relay means upon receipt of a signal from the master controller.

4. The system of claim 2 wherein the current control until further comprises a volt meter connected to the current source and to the controller means.

5. The system of claim 2 wherein the current control unit further comprises and ammeter connected to the current source and the controller means.

6. The system of claim 3 wherein the current control unit further comprises a wireless communications circuit connected to the controller for communication with the master controller.

7. The system of claim 3 wherein the current control unit further comprises a memory connected to the controller for storage of data to be transmitted to the master controller.

8. The system of claim 1 wherein the first voltage control unit further comprises:
- a controller having a memory;
- a volt meter;
- a multiplexer means, connected to the volt meter, the array of electrodes and the controller, for reconfigurably indexing the volt meter among the array of electrodes upon the receipt of a first signal from the controller; and
- a relay means, connected to at least the current control unit, the second voltage control unit and the controller for reconfigurably distributing the injection current among the array of electrodes upon the receipt of a second signal from the controller.

9. The system of claim 8 wherein the first voltage control unit further comprises an indexible set switch, connected to the controller for setting a reconfigurable address of the first voltage control unit.

10. The system of claim 8 wherein the first voltage control unit further comprises a Global Positioning System (GPS) locator circuit connected to the controller for determining a physical location of the first voltage control unit.

11. The system of claim 8 wherein the first voltage control unit further comprises an electronic address unique to the first voltage control unit stored in the memory.

12. The system of claim 1 wherein each of the voltage control units in the set of voltage control units is of identical construction.

13. The system of claim 1 wherein the ground surface is a slab foundation.

14. The system of claim 13 wherein the slab foundation is for an existing structure.

15. A method of collecting subsurface resistivity data from a subsurface media comprising the steps of:
- inserting an array of electrodes through a planar horizontal slab foundation to contact the subsurface media and dispersing the array of electrodes in a two-dimensional pattern in the slab foundation;
- providing an array of sensors deployed in a two-dimensional pattern among and connected to the array of electrodes;
- providing a voltage measuring device in each sensor in the array of sensors;
- providing a current source connected to the array of sensors;
- providing a switch matrix in each sensor in the array of sensors; and
- reconfigurably setting the switch matrix in at least one sensor in the array of sensors to distribute current to at least one electrode in the array of electrodes and take a voltage measurement from the voltage measuring devices from at least two electrodes in the array of electrodes.

16. The method of claim 15 wherein the step of reconfigurably setting the switch matrix further comprises the step of reconfigurably setting the switch matrix according to a predefined permutation.

17. The method of claim 15 wherein the predefined permutation further comprises the steps of:
- assigning a set of unique addresses to the array of sensors;
- indexing current from the current source to the array of electrodes according to the set of unique addresses; and
- indexing voltage measurements among the array of electrodes according to the set of unique addresses.

18. The method of claim 17 wherein the step of assigning includes the further step of mechanically setting a switch in at least one sensor in the array of sensors.

19. The method of claim 17 wherein the step of assigning includes the further step of electronically setting an address value in a memory of at least one sensor in the array of sensors.

20. The method of claim 17 further comprising the steps of:
- removing a first sensor in the array of sensors;
- replacing the first sensor with a second sensor; and
- assigning the second sensor the unique address of the first sensor.

21. The method of claim 15 comprising the further step of:
- recognizing an error in a first sensor in the array of sensors; and
- resetting the switch matrix in at least a second sensor in the array of sensors to compensate for the error.

22. The method of claim 15 comprising the further steps of:
- recognizing an error in at least one sensor in the array of sensors; and
- replacing the at least one sensor in the array of sensors with at least one other sensor of identical construction.

23. The method of claim 15 comprising the further step of recognizing an error in at least one sensor in the array of sensors and initiating a visible indicator signal located on the at least one sensor.

24. The method of claim 15 further comprising the steps of analyzing the distributed current and the voltage measurements to arrive at a set of field data related to the subsurface media.

25. The method of claim 24 wherein the step of analyzing further comprises the steps of:
- calculating an apparent resistivity field from the field data;
- identifying a standard field data model;
- performing a regression analysis on the apparent resistivity field and the standard field data model; and
- preparing a new field data model from the regression analysis.

26. The method of claim 25 further comprising the step of assembling the new field data model into a moving picture of the field data.

27. The method of claim 15 comprising the further steps of orienting the array of sensors among the array of electrodes according to a predetermined set of locations in the two-dimensional pattern by using a Global Positioning System (GPS) signal associated with each sensor in the array of sensors.

28. The method of claim 15 wherein the step of reconfigurably setting comprises the further step of deriving a switch mask for controlling the switch matrix in at least one sensor in the array of sensors.

29. The method of claim 15 further comprising the steps of:
- providing a wireless connection between each sensor in the array of sensors; and
- using the wireless connection to reconfigurably set the switch matrix in at least one sensor in the array of sensors.

30. The method of claim 15 comprising the further step of orienting the array of sensors among the array of electrodes by sequentially activating the sensors in a pattern related to a position of the array of electrodes.

* * * * *